US011825337B2

(12) United States Patent
De Andrade Jardim et al.

(10) Patent No.: US 11,825,337 B2
(45) Date of Patent: *Nov. 21, 2023

(54) 5G SYSTEM SUPPORT FOR VIRTUAL TSN BRIDGE MANAGEMENT, QOS MAPPING AND TSN QBV SCHEDULING

(71) Applicant: Telefonaktiebolaget LM Ericsson (publ), Stockholm (SE)

(72) Inventors: Marilet De Andrade Jardim, Kista (SE); Kefeng Kenny Zhang, Beijing (CN); János Harmatos, Budapest (HU); János Farkas, Kecskemét (HU); Kun Wang, Solna (SE); Paul Schliwa-Bertling, Ljungsbro (SE); Joachim Sachs, Sollentuna (SE); Balázs Varga, Budapest (HU); Maria Belen Pancorbo Marcos, Madrid (ES); Chunmeng Wang, Beijing (CN); György Miklós, Pilisborosjenő (HU); Shabnam Sultana, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,645

(22) Filed: Jul. 13, 2022

(65) Prior Publication Data

US 2022/0369157 A1  Nov. 17, 2022

Related U.S. Application Data

(63) Continuation of application No. 17/431,202, filed as application No. PCT/IB2020/051264 on Feb. 14, 2020, now abandoned.

(Continued)

(51) Int. Cl.
*H04W 28/02* (2009.01)
*H04W 76/12* (2018.01)
(Continued)

(52) U.S. Cl.
CPC ..... *H04W 28/0268* (2013.01); *H04L 12/4641* (2013.01); *H04L 47/2416* (2013.01); *H04L 47/283* (2013.01); *H04W 76/12* (2018.02)

(58) Field of Classification Search
None
See application file for complete search history.

(56) References Cited

U.S. PATENT DOCUMENTS 9,332,579 B2 * 5/2016 Scherer ............... H04L 61/103
11,088,962 B2   8/2021 Chen et al.
(Continued)

FOREIGN PATENT DOCUMENTS

CN  108366023 A   8/2018
CN  108809852 A   11/2018
(Continued)

OTHER PUBLICATIONS

IEEE Standards Association. Bridges and Bridged Networks Amendment 25: Enhancements for Scheduled Traffic. IEEE8021Qbv-2015. (Year: 2015).*

(Continued)

*Primary Examiner* — Andre Tacdiran
(74) *Attorney, Agent, or Firm* — Withrow & Terranova, PLLC

(57) ABSTRACT

Systems and method are disclosed herein that relate to support for virtual Time-Sensitive Networking (TSN) bridge management, Quality of Service (QoS) mapping, and TSN related scheduling in a cellular communications system. In some embodiments, a method performed by one or more network nodes of a cellular communications system oper- (Continued)

ating as a virtual TSN bridge of a TSN network comprises providing, to a controller associated with the TSN network, parameters that relate to capabilities of the virtual TSN bridge. The parameters that relate to the capabilities of the virtual TSN bridge comprise a first parameter that defines a clock accuracy of an entity in the cellular communications system that operates gating control for the virtual TSN bridge and a second parameter that informs the controller associated with the TSN network that the virtual TSN bridge or a particular egress port of the virtual TSN bridge is restricted to exclusive gating.

16 Claims, 25 Drawing Sheets

Related U.S. Application Data

(60) Provisional application No. 62/805,727, filed on Feb. 14, 2019.

(51) Int. Cl.
  *H04L 12/46* (2006.01)
  *H04L 47/2416* (2022.01)
  *H04L 47/283* (2022.01)

(56) References Cited

U.S. PATENT DOCUMENTS

| | | | | |
|---|---|---|---|---|
| 2015/0373660 | A1* | 12/2015 | Gunnarsson | H04W 76/27 370/350 |
| 2018/0184428 | A1 | 6/2018 | Cariou et al. | |
| 2018/0220356 | A1* | 8/2018 | Tenny | H04W 48/02 |
| 2019/0297025 | A1* | 9/2019 | Kobayashi | H04L 47/50 |
| 2019/0363843 | A1* | 11/2019 | Gordaychik | H04W 52/58 |
| 2020/0059829 | A1* | 2/2020 | Joseph | H04W 36/0011 |
| 2020/0137615 | A1* | 4/2020 | Joseph | H04W 24/02 |
| 2020/0389405 | A1* | 12/2020 | Mardmoeller | H04L 12/40143 |
| 2021/0007160 | A1* | 1/2021 | Sivasiva Ganesan | H04W 28/0268 |
| 2021/0204172 | A1 | 7/2021 | Rost et al. | |
| 2021/0306901 | A1* | 9/2021 | Mannweiler | H04L 45/02 |
| 2022/0022088 | A1 | 1/2022 | Gebert et al. | |

FOREIGN PATENT DOCUMENTS

| | | | |
|---|---|---|---|
| CN | 111865830 | * | 4/2019 |
| WO | 2017082779 | A1 | 5/2017 |
| WO | 2018166576 | A1 | 9/2018 |
| WO | 2020104946 | A1 | 5/2020 |
| WO | 2020148616 | A1 | 7/2020 |

OTHER PUBLICATIONS

Craciunas. Scheduling Real-Time Communication in IEEE 802. 1Qbv Time Sensitive Networks. RTNS '16: Proceedings of the 24th International Conference on Real-Time Networks and Systems. Oct. 2016. Pages 183-192https://doi.org/10.1145/ 2997465.2997470. (Year: 2016).*
Non-Final Office Action for U.S. Appl. No. 17/294,997, dated Apr. 14, 2022, 22 pages.
Non-Final Office Action for U.S. Appl. No. 17/431,202, dated Feb. 9, 2022, 19 pages.
Author Unknown, "3rd Generation Partnership Project; Technical Specification Group Services and System Aspects; Study on Communication for Automation in Vertical Domains (Release 16)," 3GPP TR 22.804 V16.1.0, Sep. 2018, 3GPP Organizational Partners, 189 pages.
Author Unknown, "Technical Specification Group Services and System Aspects; Study on Communication for Automation in Vertical Domains (Release 16)," Technical Report 22.804, Version 16.2.0, 3GPP Organizational Partners, Dec. 2018, 196 pages.
Author Unknown, "Technical Specification Group Services and System Aspects; Study on Cellular Internet of Things (IoT) support and evolution for the 5G System (Release 16)," Technical Report 23.724, Version 16.0.0, 3GPP Organizational Partners, Dec. 2018, 276 pages.
Author Unknown, "3rd Generation Partnership Project; Technical Specification Group Services and System Aspects; Study on 5GS Enhanced support of Vertical and LAN Services (Release 16)," 3GPP TR 23.734 V0.2.0, Sep. 2018, 3GPP Organizational Partners, 39 pages.
Author Unknown, "Technical Specification Group Services and System Aspects; Study on enhancement of 5GS for Vertical and LAN Services (Release 16)," Technical Report 23.734, Version 16.0.0, 3GPP Organizational Partners, Dec. 2018, 107 pages.
Author Unknown, "Technical Specification Group Services and System Aspects; Study on enhanement of 5GS for Vertical and LAN Services (Release 16)," Technical Report 23.734, Version 16.1.0, 3GPP Organizational Partners, Mar. 2019, 111 pages.
Author Unknown, "Technical Specification Group Services and System Aspects; Study on enhancement of 5G System (5GS) for vertical and Local Area Network (LAN) services (Release 16)," Technical Report 23.734, Version 16.2.0, Jun. 2019, 3GPP Organizational Partners, 117 pages.
Author Unknown, "3rd Generation Partnership Project; Technical Specification Group Radio Access Network; Study on NR Industrial Internet of Things (IoT); Release 16," 3GPP TR 38.825 V0.0.0, Sep. 2018, 3GPP Organizational Partners, 10 pages.
Author Unknown, "Technical Specification Group Services and System Aspects; Service requirements for cyber-physical control applications in vertical domains; Stage 1 (Release 16)," Technical Specification 22.104, Version 1.0.0, 3GPP Organizational Partners, Dec. 2018, 55 pages.
Author Unknown, "Technical Specification Group Services and System Aspects; System Architecture for the 5G System; Stage 2 (Release 15)," Technical Specification 23.501, Version 15.3.0, 3GPP Organizational Partners, Sep. 2018, 226 pages.
Author Unknown, "Technical Specification Group Services and System Aspects; System Architecture for the 5G System (5GS); Stage 2 (Release 15)," Technical Specification 23.501, Version 15.8.0, 3GPP Organizational Partners, Dec. 2019, 248 pages.
Author Unknown, "Technical Specification Group Services and System Aspects; System Architecture for the 5G System; Stage 2 (Release 16)," Technical Specification 23.501, Version 16.0.2, Apr. 2019, 3GPP Organizational Partners, 317 pages.
Author Unknown, "Technical Specification Group Services and System Aspects; Procedures for the 5G System; Stage 2 (Release 15)," Technical Specification 23.502, Version 15.4.0, 3GPP Organizational Partners, Dec. 2018, 346 pages.
Author Unknown, "Technical Specification Group Services and System Aspects; Procedures for the 5G System; Stage 2 (Release 16)," Technical Specification 23.502, Version 16.0.2, Apr. 2019, 3GPP Organizational Partners, 419 pages.
Author Unknown, "Technical Specification Group Services and System Aspects; Policy and Charging Control Framework for the 5G System; Stage 2 (Release 15)," Technical Specification 23.503, Version 15.3.0, 3GPP Organizational Partners, Sep. 2018, 70 pages.
Author Unknown, "Technical Specification Group Services and System Aspects; Policy and Charging Control Framework for the 5G System; Stage 2 (Release 15)," Technical Specification 23.503, Version 15.4.0, 3GPP Organizational Partners, Dec. 2018, 76 pages.
Author Unknown, "Technical Specification Group Radio Access Network; NG-RAN; NG Application Protocol (NGAP) (Release 15)," Technical Specification 38.413, Version 15.5.0, 3GPP Organizational Partners, Sep. 2019, 329 pages.
Author Unknown, "Draft Standard for Local and metropolitan area networks—Bridges and Bridged Networks; Amendment: Stream Reservation Protocol (SRP) Enhancements and Performance Improvements," IEEE P802.1Qcc/D2.3, May 3, 2018, 214 pages.

(56) References Cited

OTHER PUBLICATIONS

Author Unknown, "IEEE Standard for Local and metropolitan area networks—Bridges and Bridged Networks, Amendment 25: Enhancements for Scheduled Traffic," IEEE Computer Society, IEEE Std 802.1Qbv, 2015, 57 pages.
CATT, "R2-1816363: 5GS and TSN Integration," 3GPP TSG-RAN WG2 Meeting #104, Nov. 12-16, 2018, Spokane, USA, 5 pages.
Ericsson, "C3-182341: Changes to C3-182188: QoS Parameter mapping in PCF," Third Generation Partnership Project (3GPP), TSG-CT WG3 Meeting #96, Apr. 16-20, 2018, Kunming, China, 8 pages.
Ericsson, "S2-19xxxx: Support for IEEE 802.1Qbv scheduling," 3GPP TSG-SA WG2 Meeting #131, Feb. 25-Mar. 1, 2019, Santa Cruz, Spain, 7 pages.
Ericsson, "S2-19xxxx: TSN-5GS QoS parameters mapping," 3GPP TSG-SA WG2 Meeting #131, Feb. 25-Mar. 1, 2019, Santa Cruz, Spain, 13 pages.
Ericsson, "S2-1900610: Additional TSN traffic patter for RAN optimization," Third Generation Partnership Project (3GPP), TSG-SA WG2 Meeting #130, Jan. 21-25, 2019, Kochi, India, 6 pages.
Ericsson, "S2-1901150: TSN QoS and traffic scheduling in 5GS," Third Generation Partnership Project (3GPP), TSg-SA WG2 Meeting #130, Jan. 21-25, 2019, Kochi, India, 9 pages.
Ericsson, "S2-1901721: Mapping of bridge port and QoS control in 5GS," 3GPP TSG-SA WG2 Meeting #131, Change Request, Feb. 25-Mar. 1, 2019, Santa Cruz, Spain, 7 pages.
Ericsson, "S2-1903375: TSN-5GS QoS mapping partly at AF and PCF," Third Generation Partnership Project (3GPP), TSG-SA WG2 Meeting #132, Apr. 8-12, 2019, Xi'an, China, 7 pages.
Finn, "Introduction to Time-Sensitive Networking," IEEE Communications Standards Magazine, vol. 2, Issue 2, Jun. 2018, pp. 22-28.
Huawei et al., "S2-1811211: QoS Negotiation between 3GPP and TSN networks KI#3.1," Sa WG2 Meeting #129, Oct. 15-19, 2018, Dongguan, China, 10 pages.
Huawei, et al., "S2-1900590: Discussion on system enhancement for TSN logical bridge management," 3GPP TSG-SA WG2 Meeting #130, Jan. 21-25, 2019, Kochi, India, 4 pages.
Kagermann, et al., "Recommendations for implementing the strategic initiative INDUSTRIE 4.0," Final report of the Industrie 4.0 working group, acatech—National Academy of Science and Engineering, Munich, Apr. 2013, 84 pages.
Kentis, et al., "Effects of Port Congestion in the Gate Control List Scheduling of Time Sensitive Networks," 8th International Conference on the Network of the Future (NOF), IEEE, 2017, pp. 138-140.
Neumann, Arne, et al., "Towards Integration of Industrial Ethernet with 5G Mobile Networks," International Workshop on Factory Communication Systems, Jun. 2018, IEEE, 4 pages.
Nokia, et al., "R2-1814992: TSN performance requirements evaluation," Third Generation Partnership Project (3GPP), TSG-RAN WG2 Meeting #103bis, Oct. 8-12, 2018, Chengdu, China, 9 pages.
Nokia, et al., "R2-1817270: NR support for TSN traffic patterns," Third Generation Partnership Project (3GPP), TSG-RAN WG2 Meeting #104, Nov. 12-16, 2018, Spokane, USA, 9 pages.
Nokia et al., "S2-1810436: TSN—QoS Framework," SA WG2 Meeting #129, Oct. 15-19, 2018, Dongguan, China, 9 pages.
Nokia, et al., "S2-1903656: Update to Support PDU Session Binding," SA WG2 Meeting #132, Apr. 8-12, 2019, Xian, China, 4 pages.
Qualcomm Incorporated, et al., "S2-1906754: Addressing Editor's notes on TSN," 3GPP TSG-SA2 Meeting #133, May 13-17, 2019, Reno, Nevada, 13 pages.
Siemens AG, et al., "S1-183120: cyberCAV—5G in Industrial Automation: Different and Multiple Time Domains for Synchronization," 3GPP TSG-SA WG1 Meeting #84, Nov. 12-16, 2018, Spokane, Washington, 8 pages.

Office Action for Chinese Patent Application No. 202080014340.3, dated Jan. 21, 2022, 6 pages.
Examination Report for Indian Patent Application No. 202147040911, dated Apr. 28, 2022, 6 pages.
International Search Report and Written Opinion for International Patent Application No. PCT/IB2019/059942, dated Feb. 4, 2020, 17 pages.
Written Opinion for International Patent Application No. PCT/IB2019/059942, dated Oct. 7, 2020, 11 pages.
International Preliminary Report on Patentability for International Patent Application No. PCT/IB2019/059942, dated Feb. 9, 2021, 24 pages.
Invitation to Pay Additional Fees and Partial Search for International Patent Application No. PCT/IB2020/050181, dated Apr. 1, 2020, 14 pages.
International Search Report and Written Opinion for International Patent Application No. PCT/IB2020/050181, dated May 18, 2020, 28 pages.
Invitation to Pay Additional Fees and Partial Search for International Patent Application No. PCT/IB2020/051264, dated May 8, 2020, 7 pages.
International Search Report and Written Opinion for International Patent Application No. PCT/IB2020/051264, dated Jun. 30, 2020, 16 pages.
Invitation to Pay Additional Fees and Partial Search for International Patent Application No. PCT/IB2020/054483, dated Aug. 17, 2020, 15 pages.
International Search Report and Written Opinion for International Patent Application No. PCT/IB2020/054483, dated Oct. 8, 2020, 21 pages.
Second Office Action for Chinese Patent Application No. 202080014340.3, dated Jun. 28, 2022, 7 pages.
Examination Report for European Patent Application No. 20708642.2, dated Jun. 9, 2022, 7 pages.
Final Office Action for U.S. Appl. No. 17/294,997, dated Oct. 14, 2022, 27 pages.
Final Office Action for U.S. Appl. No. 17/431,202, dated Sep. 23, 2022, 16 pages.
Ericsson, "C3-182188: QoS parameter mapping in PCF," 3GPP TSG-CT WG3 Meeting #96, Apr. 16-20, 2018, Kunming, China, 8 pages.
LG Electronics, "S2-1810280: Discussion on QoS in MA-PDU," 3GPP TSG-SA WG2 Meeting #129, Oct. 15-19, 2018, Dongguan, China, 9 pages.
Nokia, et al., "S2-1811209: TSn—QoS Framework," 3GPP SA WG2 Meeting #129, Oct. 15-19, 2018, Dongguan, China, 12 pages.
Examination Report for European Patent Application No. 20702358.1, dated Dec. 13, 2022, 9 pages.
Notice of Reasons for Rejection for Japanese Patent Application No. 2021-571531, dated Jan. 24, 2023, 8 pages.
Advisory Action for U.S. Appl. No. 17/431,202, dated Dec. 23, 2022, 4 pages.
Non-Final Office Action for U.S. Appl. No. 17/294,997, dated Mar. 30, 2023, 25 pages.
Examination Report for European Patent Application No. 19809637.2, dated Jun. 23, 2023, 8 pages.
Final Office Action for U.S. Appl. No. 17/294,997, dated Jul. 7, 2023, 28 pages.
Non-Final Office Action for U.S. Appl. No. 17/422,496, dated Jun. 29, 2023, 11 pages.
Non-Final Office Action for U.S. Appl. No. 18/106,761, dated Jul. 19, 2023, 19 pages.
Advisory Action for U.S. Appl. No. 17/294,997, dated Sep. 20, 2023, 4 pages.

* cited by examiner

| Class (Key) | Priority | independentDelayMax | PDB | 5QI Value | Priority Level | PER | MDBV | Averaging Window |
|---|---|---|---|---|---|---|---|---|
| 7 | 7 | 5 ms | 5 ms | 85 | 21 | $10^{-5}$ | 255 B | 2000 ms |
| 6 | 6 | 10 ms | 10 ms | 83 | 22 | $10^{-4}$ | 1354 B | 2000 ms |
| ... | ... | ... | ... | ... | ... | ... | ... | ... |

TSN parameters reported | 5GS parameters

*FIG. 10*

| Class (Key) | Priority | independentDelayMax | | PDB | 5QI Value | Priority Level | PER | MDBV | Averaging Window |
|---|---|---|---|---|---|---|---|---|---|
| 7 | 7 | 5 ms | | 5 ms | xx | 21 | $10^{-5}$ | 255 B | 2000 ms |
| | | | | 5 ms | yy | 30 | $10^{-4}$ | 1354 B | 2000 ms |
| | | | | ... | | | ... | | |

TSN parameters reported | 5GS parameters

*FIG. 17*

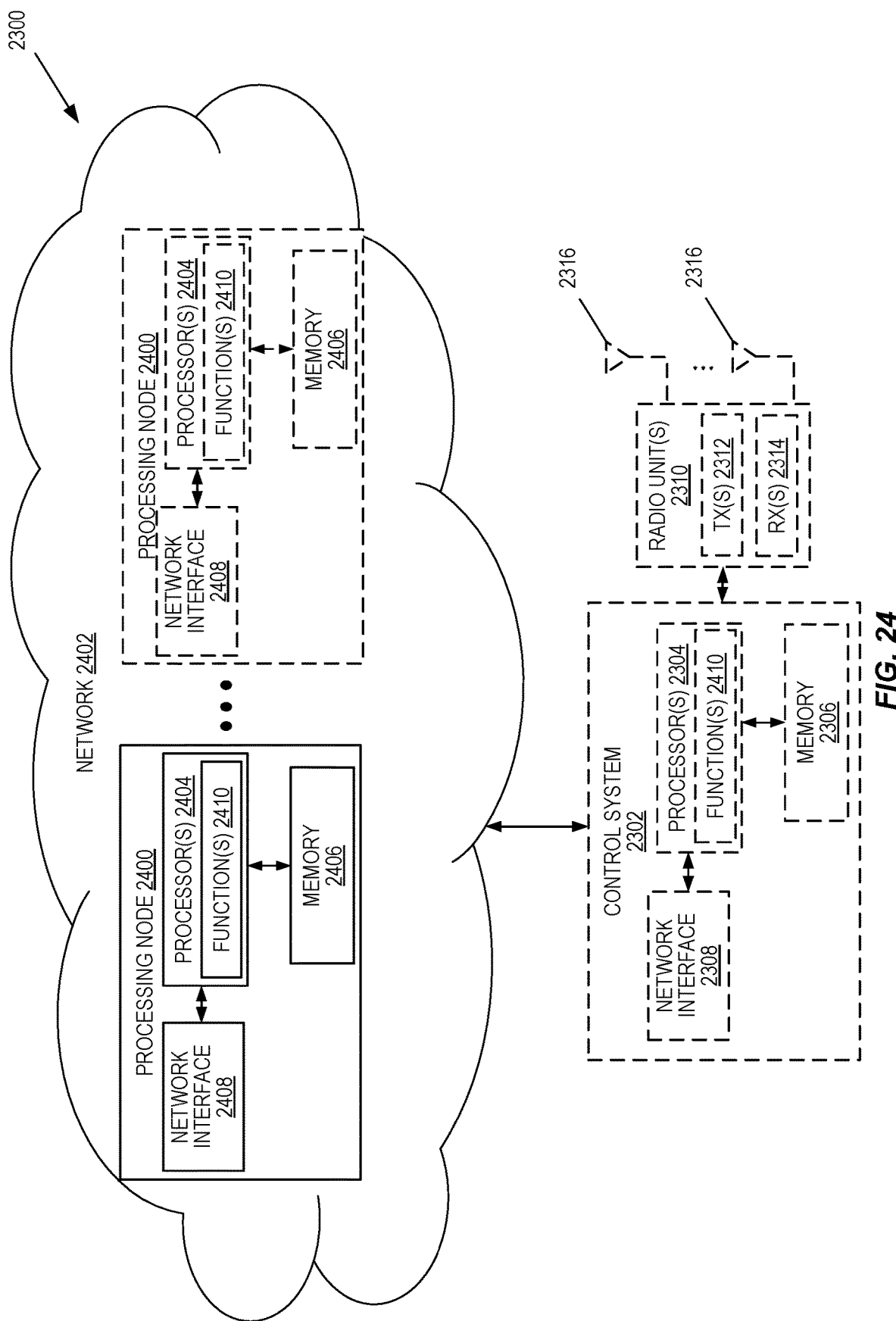

5G SYSTEM SUPPORT FOR VIRTUAL TSN BRIDGE MANAGEMENT, QOS MAPPING AND TSN QBV SCHEDULING

RELATED APPLICATIONS

This application is a continuation of U.S. application Ser. No. 17/431,202, filed Aug. 16, 2021, which is a 35 U.S.C. § 371 national phase filing of International Application No. PCT/IB2020/051264, filed Feb. 14, 2020, which claims the benefit of provisional patent application Ser. No. 62/805,727, filed Feb. 14, 2019, the disclosures of which are hereby incorporated herein by reference in their entireties.

TECHNICAL FIELD

The present disclosure relates to a cellular communications system and, more specifically, to a cellular communications system that operates as a virtual node in a Time-Sensitive Networking (TSN) network.

BACKGROUND

The manufacturing industry is undergoing a digital transformation towards the "Fourth Industrial Revolution" (Industry 4.0) [1] towards smart manufacturing. Flexible connectivity infrastructure is a key enabler for manufacturing to interconnect machines, products, and all kinds of other devices in a flexible, secure, and consistent manner.

The Third Generation Partnership Project (3GPP) Fifth Generation (5G) system, as an alternative to or complementing the wired connectivity solution, should support new requirements and challenges coming from these vertical domains. 3GPP has a study on Communication for Automation in Vertical Domains (Technical Report (TR) 22.804), where many use cases from vertical domains are analyzed. Industrial automation applications such as motion control have extremely stringent service requirements on high availability, ultra-reliable, low latency, low jitter, and determinism, e.g., 1-10 milliseconds (ms) end-to-end latency, 1-100 microsecond (μs) packet delay variation [2].

Today, wireline fieldbus solutions such as PROFINET®, EtherCAT®, and Ethernet/Internet Protocol (IP) are mostly used on the factory shop floor to interconnect sensors, actuators, and controllers in an automation system. Institute of Electrical and Electronics Engineers (IEEE) 802.1 Time-Sensitive Networking (TSN) as a novel technology will be able to provide manufacturing industries with deterministic, guaranteed latencies and extremely low packet loss services through standard IEEE 802 networks in the near future.

One of the IEEE 802.1 TSN standards, 802.1Qbv, can provide on-time delivery of TSN frames. It defines a means to transmit certain Ethernet frames on a time-based schedule. IEEE 802.1Qbv requires time synchronization, i.e. each bridge has to be aware of the same time.

There currently exist certain challenge(s). It is desirable to utilize a 5G System (5GS) as a virtual TSN node (e.g., a virtual TSN bridge). This brings about new challenges that must be addressed.

SUMMARY

Systems and method are disclosed herein that relate to support for virtual Time-Sensitive Networking (TSN) bridge management, Quality of Service (QoS) mapping, and TSN related scheduling in a cellular communications system such as, for example, the Fifth Generation System (5GS). In some embodiments, a method performed by one or more network nodes of a cellular communications system, the cellular communications system operating as a virtual TSN bridge of a TSN network, comprises providing, to a controller associated with the TSN network, one or more parameters that relate to capabilities of the virtual TSN bridge. The one or more parameters that relate to the capabilities of the virtual TSN bridge comprise a first parameter and a second parameter. The first parameter defines a clock accuracy of an entity in the cellular communications system that operates gating control for the virtual TSN bridge. The second parameter informs the controller associated with the TSN network that the virtual TSN bridge or a particular egress port of the virtual TSN bridge is restricted to exclusive gating, wherein exclusive gating means that only frames belonging to a single TSN traffic class can be transmitted from egress ports of the virtual TSN bridge or the particular egress port of the virtual TSN bridge at a given time.

In some embodiments, the one or more network nodes consist of an application function associated with a core network of the cellular communications system such that the method performed by the one or more network nodes is a method performed by the application function. Further, providing the one or more parameters that relate to capabilities of the virtual TSN bridge to the controller associated with the TSN network comprises providing, from the application function to the controller associated with the TSN network, the one or more parameters that relate to capabilities of the virtual TSN bridge. In some embodiments, the method further comprises receiving, at the application function, at least the first parameter from another network node that is in a core network of the cellular communications system via a cellular network procedure. In some embodiments, the method further comprises receiving, from the controller associated with the TSN network, a plurality of TSN bridge configuration parameters and either: (a) sending only a subset of the plurality of TSN bridge configuration parameters to one or more other network nodes in the cellular communications system or (b) sending, to the one or more other network nodes, information that corresponds to a translation of the subset of the plurality of TSN bridge configuration parameters into one or more parameters of the cellular communications system. The subset of the plurality of TSN bridge configuration parameters is less than all of the plurality of TSN bridge configuration parameters.

In some embodiments, the TSN network is an Institute of Electrical and Electronics Engineers (IEEE) 802.1Qbv TSN network, and the subset of the plurality of TSN bridge configuration parameters comprises an AdminControlList parameter and an AdminBaseTime parameter. The AdminControlList describes a sequence of gate operation states in a list of GateControlEntries, wherein each GateControlEntry in the list of GateControlEntries comprises a GateStatesValue parameter that is a list of gate state values that indicate either "open" or "closed" for each TSN traffic class supported by a respective TSN port and a TimeIntervalValue parameter that specifies a time during which the list of gate state values indicated by the GateStatesValue parameter are to be applied. The AdminBaseTime parameter specifies when a gating cycle is to be started. In some embodiments, the subset of the plurality of TSN bridge configuration parameters further comprises: (i) queueMaxSDUTable, (ii) SupportedListMax, (iii) AdminGateStates, or (iv) any combination of two or more of i, ii, and iii.

In some embodiments, the one or more network nodes consist of an egress node of the cellular communications system such that the method performed by the one or more network nodes is a method performed by the egress node, and providing the one or more parameters that relate to capabilities of the virtual TSN bridge to the controller associated with the TSN network comprises sending, from the egress node to a network node in the cellular communications system, the first parameter such that the first parameter is passed from the egress node to an application function associated with the TSN network via a cellular network procedure.

In some embodiments, the one or more network nodes consist of a User Equipment (UE) associated with a TSN translator that performs gating control such that the method performed by the one or more network nodes is a method performed by the UE, providing the one or more parameters that relate to capabilities of the virtual TSN bridge to the controller associated with the TSN network comprises sending, from the UE to a network node in the cellular communications system, the first parameter such that the first parameter is passed from the UE to an application function associated with the TSN network via a cellular network procedure. In some embodiments, the cellular network procedure is a Protocol Data Unit (PDU) session establishment procedure or a PDU session modification procedure.

In some embodiments, the one or more network nodes consist of a User Plane Function (UPF) in a core network of the cellular communications system, the UPF being associated with a TSN translator that performs gating control, such that the method performed by the one or more network nodes is a method performed by the UPF. Further, providing the one or more parameters that relate to capabilities of the virtual TSN bridge to the controller associated with the TSN network comprises sending, from the UPF to a network node in the cellular communications system, the first parameter such that the first parameter is passed from the UE to an application function associated with the TSN network via a cellular network procedure. In some embodiments, the cellular network procedure is an N4 session establishment procedure or an N4 session modification procedure.

In some embodiments, the virtual TSN bridge is a virtual TSN bridge in an IEEE 802.1Qbv TSN network. In some embodiments, the cellular communications system is a Third Generation Partnership Project (3GPP) 5GS.

Embodiments of a network node are also disclosed. In some embodiments, a network node for a cellular communications system, the cellular communications system operating as a virtual TSN bridge of a TSN network, is adapted to provide, to a controller associated with the TSN network, one or more parameters that relate to capabilities of the virtual TSN bridge. The one or more parameters that relate to the capabilities of the virtual TSN bridge comprise a first parameter and a second parameter. The first parameter defines a clock accuracy of an entity in the cellular communications system that operates gating control for the virtual TSN bridge. The second parameter informs the controller associated with the TSN network that the virtual TSN bridge or a particular egress port of the virtual TSN bridge is restricted to exclusive gating, wherein exclusive gating means that only frames belonging to a single TSN traffic class can be transmitted from egress ports of the virtual TSN bridge or the particular egress port of the virtual TSN bridge at a given time.

In some embodiments, a method performed by an application function associated with a TSN network, the application function being part of or connected to a core network of a cellular communications system operating as a virtual TSN bridge of the TSN network, comprises receiving, from a controller associated with the TSN network, TSN QoS and traffic information for a specific port pair of the virtual TSN bridge and a particular TSN traffic class. The method further comprises mapping the TSN QoS and traffic information for the specific port pair of the virtual TSN bridge and the particular TSN traffic class into one or more TSN QoS requirements for the specific port pair of the virtual TSN bridge and the particular TSN traffic class and sending the one or more TSN QoS requirements for the specific port pair of the virtual TSN bridge and the particular TSN traffic class to a Policy Control Function (PCF) that is part of the core network of the cellular communications system.

In some embodiments, the TSN QoS and traffic information for the specific port pair of the virtual TSN bridge and the particular TSN traffic class comprises an indicator the of particular TSN traffic class.

In some embodiments, the one or more TSN QoS requirements for the specific port pair of the virtual TSN bridge and the particular TSN traffic class comprise latency of the virtual TSN bridge per port in the specific port pair for the particular TSN traffic class and propagation delay per port in the specific port pair.

In some embodiments, the one or more TSN QoS requirements for the specific port pair of the virtual TSN bridge and the particular TSN traffic class comprise a maximum delay independent of frame length, per port for the particular TSN traffic class, a minimum delay independent of frame length, per port for the particular TSN traffic class, a maximum delay dependent on frame length, per port for the particular TSN traffic class, a minimum delay dependent on frame length, per port for the particular TSN traffic class, and propagation delay per port in the specific port pair.

In some embodiments, the virtual TSN bridge is TSN virtual bridge in an IEEE 802.1Qbv TSN network. In some embodiments, the cellular communications system is a 3GPP 5GS.

In some embodiments, a network node that implements an application function associated with a TSN network, the application function being part of or connected to a core network of a cellular communications system operating as a virtual TSN bridge of the TSN network, is adapted to receive, from a controller associated with the TSN network, TSN QoS and traffic information for a specific port pair of the virtual TSN bridge and a particular TSN traffic class. The network node is further adapted to map the TSN QoS and traffic information for the specific port pair of the virtual TSN bridge and the particular TSN traffic class into one or more TSN QoS requirements for the specific port pair of the virtual TSN bridge and the particular TSN traffic class, and send the one or more TSN QoS requirements for the specific port pair of the virtual TSN bridge and the particular TSN traffic class to a PCF that is part of the core network of the cellular communications system.

Embodiments of a method performed by a PCF are also disclosed. In some embodiments, a method performed by a PCF in a core network of a cellular communications system, the cellular communications system operating as a virtual TSN bridge of a TSN network, comprise obtaining one or more TSN QoS requirements for a specific port pair of the virtual TSN bridge and a particular TSN traffic class from an application function associated with the TSN network, mapping the one or more TSN QoS requirements to one or more QoS related parameters that are usable in the cellular communications system, and initiating a PDU modification procedure to thereby initiate either: (a) establishment of a QoS flow in the cellular communications system for the particular TSN traffic class based on the one or more QoS related parameters or (b) binding of the particular traffic class to an existing QoS flow in the cellular communications system that satisfies the one or more QoS related parameters.

In some embodiments, the one or more TSN QoS requirements for the specific port pair of the virtual TSN bridge and the particular TSN traffic class comprise latency of the virtual TSN bridge per port in the specific port pair for the particular TSN traffic class and propagation delay per port in the specific port pair.

In some embodiments, the one or more TSN QoS requirements for the specific port pair of the virtual TSN bridge and the particular TSN traffic class comprise a maximum delay independent of frame length, per port for the particular TSN traffic class, a minimum delay independent of frame length, per port for the particular TSN traffic class, a maximum delay dependent on frame length, per port for the particular TSN traffic class, a minimum delay dependent on frame length, per port for the particular TSN traffic class, and propagation delay per port in the specific port pair.

In some embodiments, the TSN network is an IEEE 802.1Qbv TSN network. In some embodiments, the cellular communications system is a 3GPP 5GS.

In some embodiments, a network node that implements a PCF for a core network of a cellular communications system operating as a virtual TSN bridge of a TSN network is adapted to obtain one or more TSN QoS requirements for a specific port pair of the virtual TSN bridge and a particular TSN traffic class from an application function associated with the TSN network. The network node is further adapted to map the one or more TSN QoS requirements to one or more QoS related parameters that are usable in the cellular communications system and initiate a PDU modification procedure to thereby initiate either: (a) establishment of a QoS flow in the cellular communications system for the particular TSN traffic class based on the one or more QoS related parameters or (b) binding of the particular TSN traffic class to an existing QoS flow in the cellular communications system that satisfies the one or more QoS related parameters.

In some embodiments, a method performed by a PCF in a core network of a cellular communications system, the cellular communications system operating as a virtual TSN bridge of a TSN network, comprises obtaining TSN QoS and traffic information for a specific port pair of the virtual TSN bridge and a particular TSN traffic class from an application function associated with the TSN network, mapping the TSN QoS and traffic information to one or more QoS related parameters that are usable in the cellular communications system, and initiating a PDU session modification procedure to thereby initiate either: (a) establishment of a QoS flow in the cellular communications system for the traffic class based on the one or more QoS related parameters or (b) binding of the particular traffic class to an existing QoS flow in the cellular communications system that satisfies the one or more QoS related parameters.

In some embodiments, the TSN QoS and traffic information for the specific port pair of the virtual TSN bridge and the particular TSN traffic class comprises an indicator the of particular TSN traffic class.

In some embodiments, the one or more virtual TSN bridges are one or more virtual TSN bridges in a TSN network, and the TSN network is an IEEE 802.1Qbv TSN network. In some embodiments, the cellular communications system is a 3GPP 5GS.

In some embodiments, a network node that implements a PCF for a core network of a cellular communications system operating as a virtual TSN bridge of a TSN network is adapted to obtain TSN QoS and traffic information for a specific port pair of the virtual TSN bridge and a particular TSN traffic class from an application function associated with the TSN network, map the TSN QoS and traffic information to one or more QoS related parameters that are usable in the cellular communications system, and initiate a PDU session modification procedure to thereby initiate either: (a) establishment of a QoS flow in the cellular communications system for the particular TSN traffic class based on the one or more QoS related parameters or (b) binding of the particular TSN traffic class to an existing QoS flow in the cellular communications system that satisfies the one or more QoS related parameters.

In some embodiments, a method performed by an application function associated with a TSN network, the application function being part of or connected to a core network of a cellular communications system operating as a virtual TSN bridge of the TSN network, comprises receiving, from a controller associated with the TSN network, TSN QoS and traffic information for a specific port pair of the virtual TSN bridge and a particular TSN traffic class. The method further comprises mapping the TSN QoS and traffic information for the specific port pair of the virtual TSN bridge and the particular TSN traffic class into one or more QoS related parameters that are usable in the cellular communications system and sending the one or more QoS related parameters that are usable in the cellular communications system to a PCF that is part of the core network of the cellular communications system.

In some embodiments, the TSN QoS and traffic information for the specific port pair of the virtual TSN bridge and the particular TSN traffic class comprise an indicator the of particular TSN traffic class.

In some embodiments, the one or more virtual TSN bridges are one or more virtual TSN bridges in a TSN network, and the TSN network is an IEEE 802.1Qbv TSN network. In some embodiments, the cellular communications system is a 3GPP 5GS.

In some embodiments, a network node that implements an application function associated with a TSN network, the application function being part of or connected to a core network of a cellular communications system operating as a virtual TSN bridge of the TSN network, is adapted to receive, from a controller associated with the TSN network, TSN QoS and traffic information for a specific port pair of the virtual TSN bridge and a particular TSN traffic class. The network node is further adapted to map the TSN QoS and traffic information for the specific port pair of the virtual TSN bridge and the particular TSN traffic class into one or more QoS related parameters that are usable in the cellular communications system and send the one or more QoS related parameters that are usable in the cellular communications system to a PCF that is part of the core network of the cellular communications system.

Embodiments of a cellular communications system for operation as two or more virtual TSN bridges are also disclosed. In some embodiments, the cellular communications system comprises a core network comprising a first UPF and a second UPF. The first UPF is associated with a first network-side TSN translator, wherein a bridge identifier (ID) of a first virtual TSN bridge provided by the cellular communications system is bound to a UPF ID of the first UPF. The second UPF is associated with a second network-side TSN translator, wherein a bridge ID of a second virtual TSN bridge provided by the cellular communications system is bound to a UPF ID of the second UPF.

In some embodiments, the two or more virtual TSN bridges are two or more virtual TSN bridges in a TSN network, and the TSN network is an IEEE 802.1Qbv TSN network. In some embodiments, the cellular communications system is a 3GPP 5GS.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 10 illustrates an example of TSN-5GS traffic class matching in accordance with an embodiment of the present disclosure;

FIG. 17 illustrates an example of TSN-5GS QoS mapping in accordance with the third option, in accordance with an embodiment of the present disclosure;

FIGS. 23 through 25 are schematic block diagrams of a network node; and

DETAILED DESCRIPTION

Figure 1:
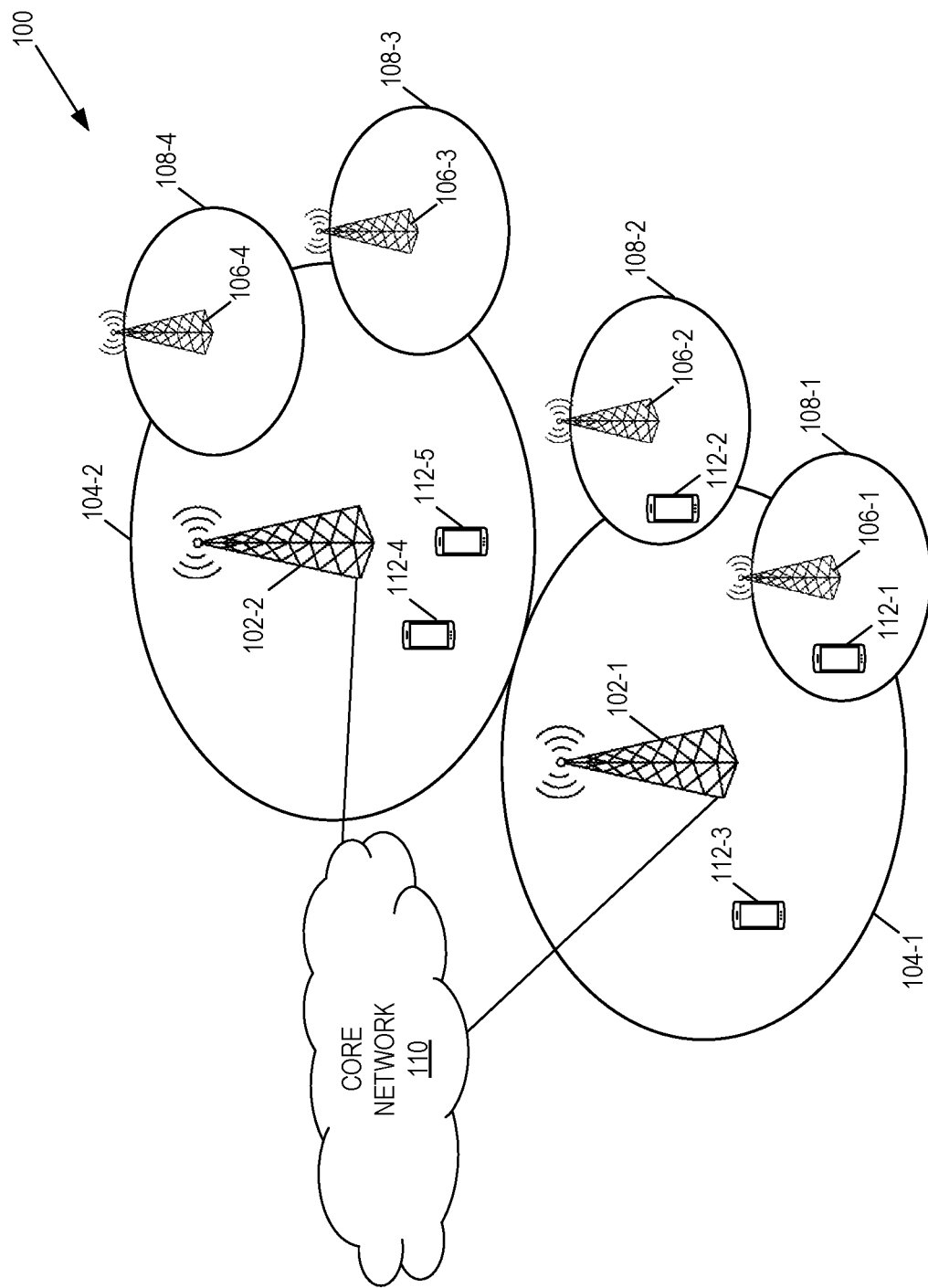
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Below, the description is divided into the following main sections:

I. 5GS Architecture in which Proposed Solutions may be Implemented
II. Support for IEEE 802.1Qbv scheduling
III. TSN-5GS QoS parameters mapping
IV. Mapping of bridge port and QoS control in 5GS
V. Additional Aspects
VI. Example Embodiments Various solutions to existing challenges are disclosed below. While these solutions are sometimes described in separate sections, it should be understood that one or more of these solutions may be used in any suitable combination.

I. General 5GS Architecture in which Proposed Solutions May be Implemented

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 1 illustrates one example of a cellular communications system 100 in which embodiments of the present disclosure (e.g., embodiments described herein in Sections II, III, and IV below) may be implemented. In the embodiments described herein, the cellular communications system 100 is a 5G System (5GS); however, the present disclosure is not limited thereto. In this example, the cellular communications system 100 includes base stations 102-1 and 102-2, which in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications system 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110. In the preferred embodiments described herein in which the cellular communications system 100 is a 5GS, the core network 110 is a 5G Core (5GC).

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Notably, while not illustrated, when operating as part of (e.g., as a bridge) in a Time-Sensitive Networking (TSN) network, the core network 110 (e.g., 5GC) is connected to a controller for the TSN. This controller typically includes a Centralized Network Configuration (CNC) station, which configures the network resource reservations and is responsible for coordinating any changes to those configured reservations with any new reservations. Reservations can be made or requested by end stations. In a fully centralized set-up where both the network and the user configuration are centralized, the CNC station receives the requirements of the data flows from a Central User Configuration (CUC) entity and then computes the route, the time schedules needed for the end-to-end transmission for each TSN flow, and configures the TSN bridges with the computed time schedule. In some embodiments described herein, the CNC is communicatively coupled to the core network 110 (e.g., the 5GC).

Figure 2:
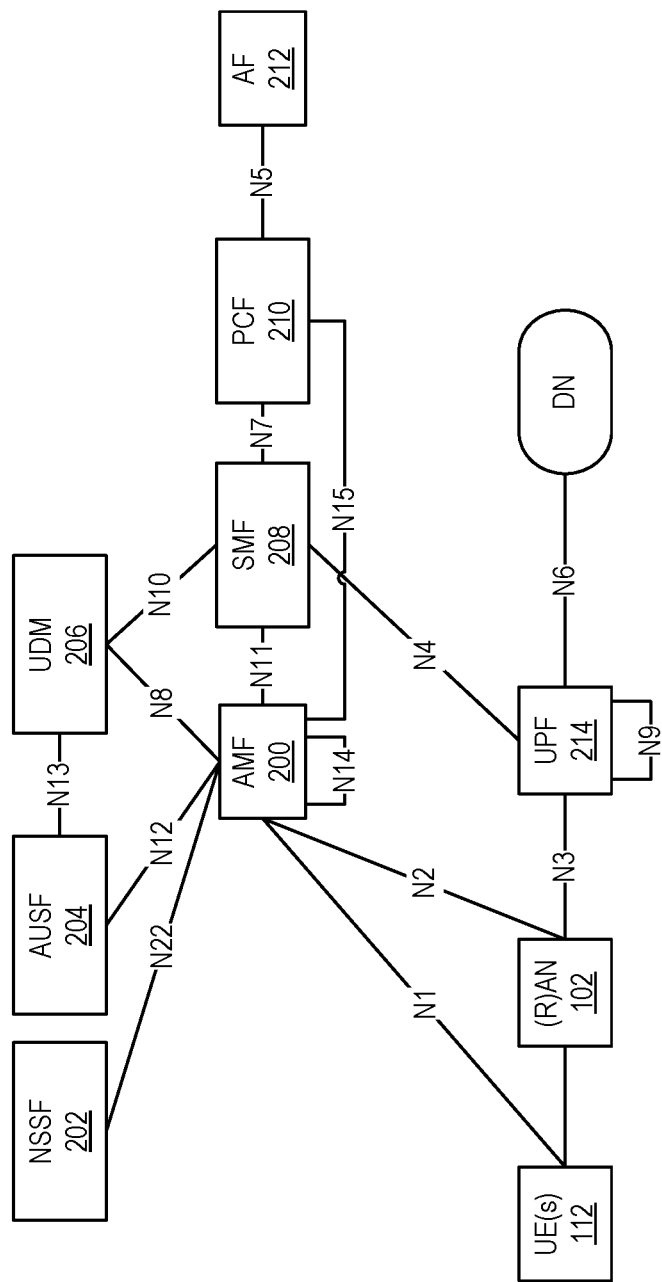
FIG. 2 illustrates a wireless communication system represented as a Fifth Generation (5G) network architecture composed of core Network Functions (NFs), where interaction between any two NFs is represented by a point-to-point reference point/interface.

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an Access and Mobility Management Function (AMF) 200. Typically, the R(AN) 102 comprises base stations, e.g. such as eNBs or gNBs or similar. Seen from the core network side, the 5G core NFs shown in FIG. 2 include a Network Slice Selection Function (NSSF) 202, an Authentication Server Function (AUSF) 204, a Unified Data Management (UDM) 206, the AMF 200, a Session Management Function (SMF) 208, a Policy Control Function (PCF) 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating user plane and control plane. The user plane carries user traffic while the control plane carries signaling in the network. In FIG. 2, the UPF 214 is in the user plane and all other NFs, i.e., the AMF 200, SMF 208, PCF 210, AF 212, NSSF 202, AUSF 204, and UDM 206, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the control plane. Separated AMF 200 and SMF 208 allow independent evolution and scaling. Other control plane functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
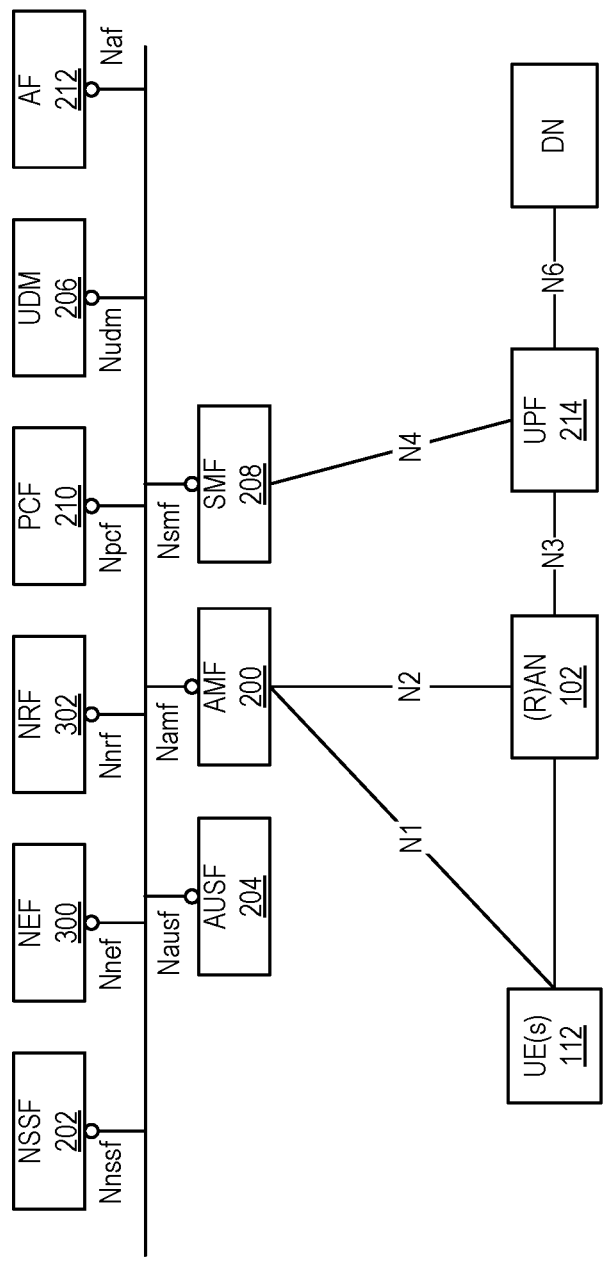
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The Network Exposure Function (NEF) 300 and the Network Repository Function (NRF) 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support Quality of Service (QoS). Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4:
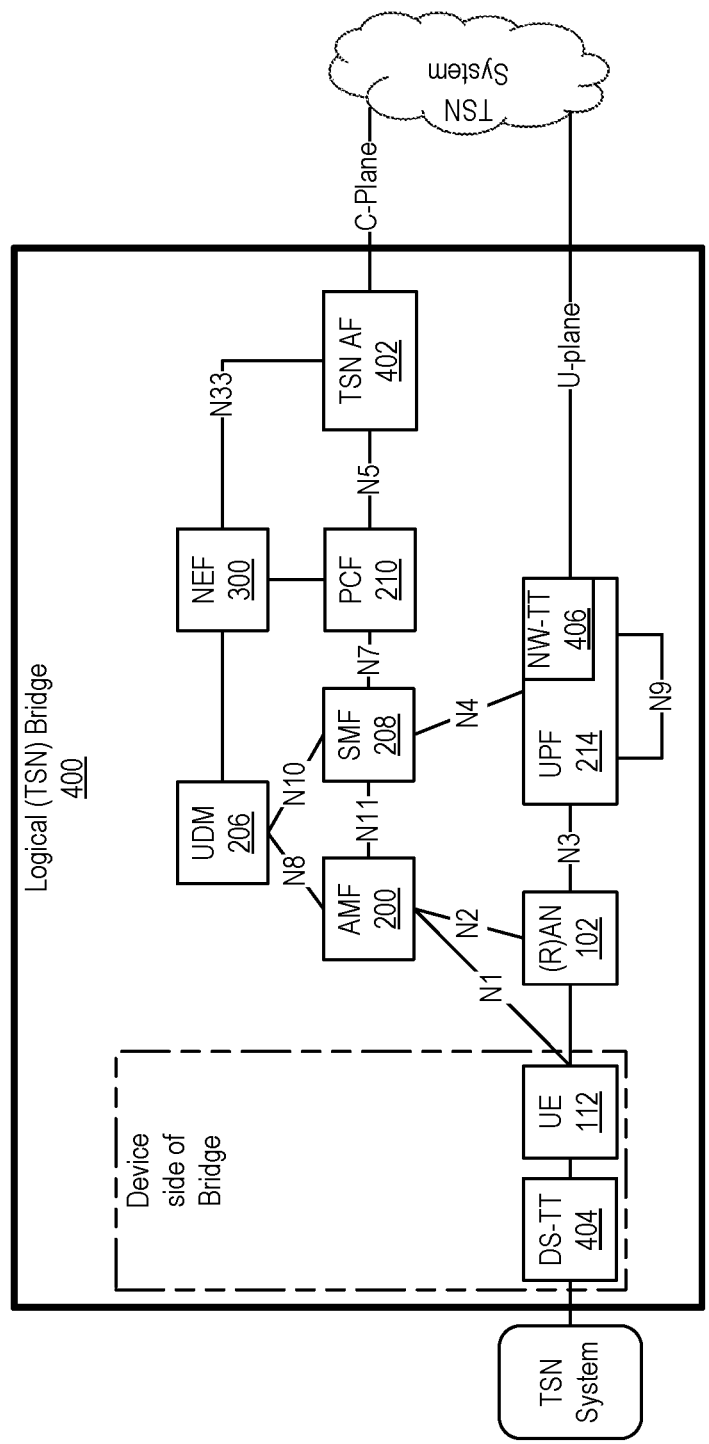
FIG. 4 shows one example of an architecture in which a 5G System (5GS) appears as a Time-Sensitive Networking (TSN) bridge.

Embodiments of the present disclosure more specifically relate to the 5GS appearing as a TSN bridge for integration with a TSN. In this regard, FIG. 4, which is a reproduction of FIG. 4.4.8.2-1 of Change Request (CR) S2-1906754 for 3GPP Technical Specification (TS) 23.501, shows one example of an architecture in which a 5GS appears as a TSN bridge 400. The architecture includes a TSN AF 402, DS-TT 404, and NW-TT 406. In this example, the TSN Translator (TT) at the UE-side, which is denoted in FIG. 4 as the DS-TT 404 and also referred to herein as UE side TT or UE/TT, is shown outside of the UE 112, and the TT at the UPF side, which is denoted in FIG. 4 as NW-TT 406 and also referred to herein as UPF side TT or UPF/TT, is shown inside of the UPF 214. However, in other embodiments, the DS-TT 404 at the UE side is alternatively implemented within the UE 112 and/or the NW-TT 406 at the UPF side is alternatively implemented outside of the UPF 214.

II. Support for IEEE 802.1Qbv Scheduling a. Introduction

The Institute for Electronics and Electrical Engineers (IEEE) 802.1Qbv standard describes enhancements for supporting scheduled traffic over a TSN domain. Proper traffic scheduling is essential for most vertical services, e.g. industry automation. In the case when IEEE 802.1Qbv is applied in the TSN domain, the 3GPP 5GS virtual bridge is to perform the scheduling on its corresponding egress ports according to IEEE 802.1Qbv. The essence of IEEE 802.1Qbv scheduling is that the frame transmission from each queue, which is associated to a Traffic Class (TC), is scheduled relative to a known timescale. In order to achieve this, a transmission gate is associated to each queue, where the state of the transmission gate determines whether or not a queued frame can be selected for transmission. The transmission gate has two states: open and closed. A gate control list is associated with each port and contains an ordered list of gate operations. Each gate operation changes the transmission gate state for the transmission gate associated with each of the port's TC queues according to a scheduled time. The period of the time over which the sequence of gate operations in the gate control list repeats is called a "gating cycle." IEEE 802.1Qbv specifies a list of parameters (i.e., a "Gate Parameter Table") that supports the enhancement of scheduled traffic. In IEEE 802.1Qcc, centralized model, the CNC calculates the gate operations based on the stream characteristics and configures the transmission gates on the ports of the TSN bridges accordingly.

In 3GPP S2-1901150: "TSN QoS and traffic scheduling in 5GS" (hereinafter "S2-1901150"), output pacing with a de-jitter buffer function was proposed to perform the TSN scheduling at the egress port of the 5GS bridge. 3GPP Technical Report (TR) 23.734 Solution #30 (see 3GPP TR 23.734 DRAFT V16.0.0+(20198-102): "Study on 5GS Enhanced support of Vertical and LAN Services") proposed a procedure of how 5GS can convey the TSN traffic pattern and corresponding scheduling information from the CNC to the relevant nodes in 5GS. The TSN traffic pattern includes information for TSN supporting such as gate control mechanism scheduling TSN traffic, etc. This part of information is identified as additional parameters for 5GS to fulfill the QoS requirement of TSN communications, which is not included in the 5G QoS model. The detailed traffic scheduling parameters were not provided in 3GPP TR 23.734 Solution #30.

This section provides an update to 3GPP TR 23.734 Solution #30. In particular, this section describes mechanisms to provide a minimal set of TSN traffic scheduling parameters that are needed for 5GS to perform output pacing/scheduling according to the IEEE 802.1Qbv scheduling.

In order to simplify 3GPP work on 5G-TSN integration, simplified IEEE 802.1Qbv support for 5GS using "exclusive gating mechanism" (protected traffic class) is proposed herein. "Exclusive gating" means that, at a given time, only one gate is open, i.e. only the frames belonging to a single TC can be transmitted. The result is that the operation of a Transmission Selection algorithm, which is specified in IEEE 802.1Qbv for selecting the frames to be transmitted if multiple gates are open, is not required on the egress ports of the 5GS bridge. It is also proposed herein that the execution/operation of output pacing/scheduling for IEEE 802.1Qbv support (e.g., implementation of Qbv scheduling state machines) should be out of 3GPP scope. As a result, the TSN CNC only needs to exchange configuration parameters with relevant 5GS nodes. These proposals are summarized as:

Proposal 1: To only introduce simplified IEEE 802.1Qbv support for 5GS with exclusive gating mechanism in 3GPP Release 16.

Proposal 2: The execution/operation of 5GS output pacing/scheduling for IEEE 802.1Qbv support (e.g., implementation of Qbv scheduling state machines) should be out of 3GPP scope.

The IEEE 802.10bv information exchange between 5GS and CNC involves two procedures:
1. 5GS virtual bridge capabilities reporting, and
2. TSN bridge configuration for 5G virtual bridge, each of which is described below.

b. 5GS Virtual Bridge Capabilities Reporting

The following parameters specified by the IEEE 802.1Qbv are used to explore the 5GS virtual bridge capabilities by the CNC.
1. TickGranularity: This parameter defines the clock accuracy of the entity which operates the IEEE 802.1Qbv gating control (output pacing). Practically, it gives the minimum value of the TimeIntervalValue.
2. ExclusiveGating: This parameter is used to inform the CNC about whether the current bridge/port is restricted to ExclusiveGating or not. The CNC can then use the information while the gate operations are calculated. Therefore, this parameter is proposed to indicate for the CNC that exclusive gating must be considered at the egress ports of the 5GS virtual bridge.

In a downlink direction, the UE or UE-side translator is the egress port of the 5GS, and therefore operates the IEEE 802.1Qbv gate scheduling. The "TickGranularity" can be passed from the UE to the TSN AF by using existing 3GPP procedures, e.g. Protocol Data Unit (PDU) session establishment/modification procedure (Option 1: SMF-NEF-AF, event notification; Option 2: SMF-PCF, session management policy modification procedure). The UE sends the information to the AMF via Non-Access Stratum (NAS) signaling, the AMF conveys information to the SMF, and the SMF forwards it to the TSN AF via an event notification procedure.

In an uplink direction, the User Plane Function (UPF) or UPF side translator performs the IEEE 802.1Qbv output pacing. The "TickGranularity" can be passed from the UPF to the AF by using existing 3GPP procedures, e.g. N4 session establishment/modification procedure (UPF to SMF), event notification procedure (SMF to NEF and AF).

The ExclusiveGating parameter can be stored in the AF and linked with a bridge identifier (ID) and port ID so that the CNC can read it and then make relevant calculations and configurations later.

The capability reports for TickGranularity and ExclusiveGating can also be optionally stored in the PCF. The SMF can propagate the information to the PCF via a Session Management Policy Modification procedure.

c. TSN Bridge Configuration for 5G Virtual Bridge

The following parameters specified by IEEE 802.1Qbv shall be provided by the CNC to the 5GS, by configuring the output pacing. The parameters are handled by the AF and, if needed, translated for the output pacing mechanism implemented by the TSN translator. As discussed above, the translator can be either an independent unit or integrated with the UE or UPF.

1. AdminControlList: This parameter describes the sequence of gate operation states in a list of GateControlEntries. The GateControlEntries consist of:

GateStatesValue: This is a list up to 8 tuples, one for each TC supported by the current port. One entity of the list indicates a value, "open" or "closed" of the port's queues. GateStatesValue specifies the state of the gates at any given time.

TimeIntervalValue: This specifies the time while the current states of the gates shall be applied; if the time specified by TimeIntervalValue expired, the next gate operation is executed. The sum of TimeIntervalValues determines the gating cycle time. After a cycle, the first operation in the gate control list is executed again.

2. AdminBaseTime: This parameter specifies when a gating cycle shall be started to execute.

Figure 5:
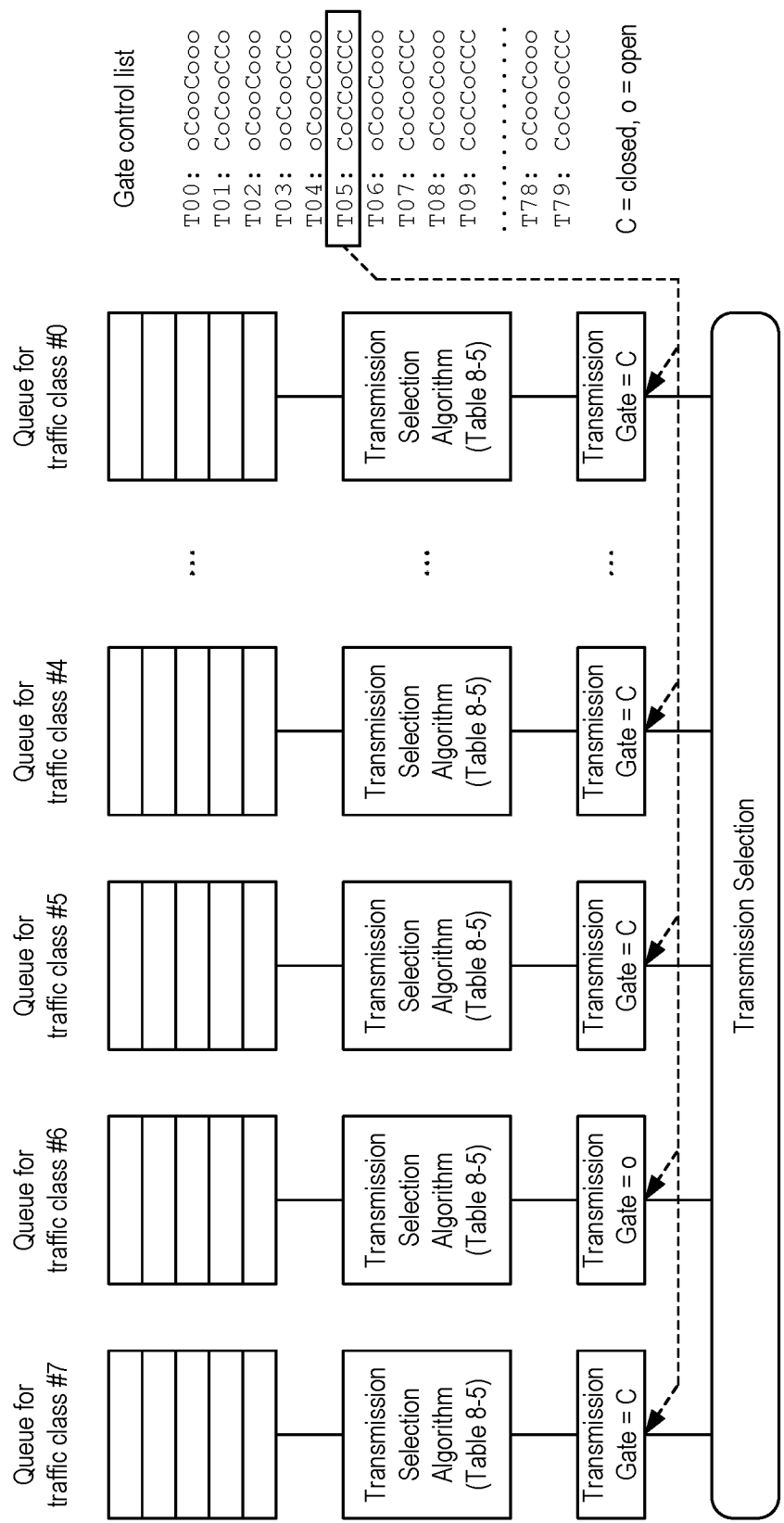
FIG. 5 illustrates gate operation according to Institute of Electronics and Electrical Engineers (IEEE) 802.1Qbv.

FIG. 5 is used for better understanding the above parameters. Note that FIG. 5 is a reproduction of a corresponding figure from the IEEE 802.1Qbv standard. "Gate control list" illustrates the AdminControlList with the list of gate schedule actions; e.g. T00, T01 and so on define the time when the given gate state should be changed to a new one (associated to TimeIntervalValue), then the states of the gates per TC (8 characters for the 8 TCs, o—open, C—closed) are shown (associated to GateStateValue). The AdminBaseTime parameter gives the absolute time when the Gate control list should be started to apply on the given port. After the final entry of the list is performed, the first list entry is applied again, according to the cyclical operation.

The above parameters are mandatory, but enough to provide the proper operation of the output pacing mechanism. The entries in the AdminControlList obviously specify which queue can be served by the output pacing at a given time. Assuming that the 5GS and TSN are properly synchronized, the output pacing can determine when execution of the gating cycle shall be started.

The following parameters optionally could also be used:
queueMaxSDUTable: This parameter can be applied if the Support Data Unit (SDU) of any traffic class should be limited on any port of the 5GS.

SuppottedListMax: This parameter can be applied if the number of gate operations (gate changes) should be limited due to any reason.

AdminGateStates: This parameter can be applied if the initial state of the gates should be set explicitly, otherwise the first entry of the AdminControList can be applied.

d. Output Pacing Configuration

The AF is responsible for managing the exchanges of the above parameters between the 5GS and the CNC. When the CNC provides the computed gate operation schedule (AdminControlList and AdminBaseTime) for a corresponding port of the 5GS virtual bridge, the AF forwards this information for the output pacing mechanism associated to the port.

Note that how the AdminControlList and AdminBaseTime are handled by the AF and how these are translated and stored for the output pacing mechanism are for future study (i.e., outside of the scope of the present disclosure).

e. Operation of the Output Pacing

On each port of the TSN virtual bridge, de-jitter buffers are deployed on a per TC basis. A de-jitter buffer belongs to a TC.

The entries of the IEEE 802.1Qbv gate control list determine the de-jitter buffer associated to the TC whose frames could be handled by the output pacing at a given time.

If multiple frames are waiting in the de-jitter buffer, then the output pacing mechanism is responsible for determining the order of the frames to be served, (e.g., First-In-First-Out (FIFO) can be applied).

f. Output Pacing with Ingress Time-Stamping

One option to optimize the order of servable frames based on latency occurs in the 5GS. When a frame is arriving, the 5GS and/or the TSN Translator (or the corresponding UPF/UE) puts a time-stamp on the frame. This time-stamp indicates the arrival time of the frame. Then, output pacing at the egress port checks the time-stamp values of the frames in the de-jitter buffer associated to the currently servable queue and selects the next frame accordingly. One option could be to select the frame with the largest delay across the 5GS by ensuring the minimization of the latency variance of the 5GS for each frame.

One alternative is to emulate a deterministic delay for the 5GS according to the delay parameters of the 5GS virtual bridge according to IEEE 802.1Qcc. In this case, the frame for which $T_{current}-T_{arrived}=D$, where D is the deterministic latency of the 5GS virtual bridge, is valid will be served. Note that $T_{current}$ is the current time and $T_{arrived}$ is the time of arrival of the frame.

g. Example Implementation as Update to 3GPP TR 23.734

Start of Change 6.30 Solution #30

6.30.1 Description 6.30.1.3 5GS support for TSN traffic scheduling

The IEEE 802.1Qbv standard describes enhancement for supporting scheduled traffic over a TSN domain. Proper traffic scheduling is essential for most Vertical services, e.g. Industry automation. In the case when 802.1Qbv is applied in the TSN domain, the 5GS virtual bridge shall perform the scheduling on its corresponding egress ports according to the 802.1Qbv. The essence of 802.1Qbv scheduling is that the frame transmission from each queue (associated to a Traffic Class—TC) is scheduled relative to a known timescale. In order to achieve this, a transmission gate is associated to each queue; the state of the gate determines whether or not a queued frame can be selected for transmission. The gate has two states: open and close. A gate control list is associated with each port contains an ordered list of gate operations. Each gate operation changes the transmission gate state for the gate associated with each of the port's traffic class queues according to a scheduled time. The period of the time over which the sequence of gate operations in the gate control list repeats called gating cycle. The 802.1Qbv specifies a list of parameters (Gate Parameter Table) that supports the enhancement of scheduled traffic. In the IEEE 802.1Qcc, centralized model, the CNC calculates the gate operations based on the stream characteristics and configures the gates on the ports of the TSN bridges accordingly.

In order to simplify 3GPP Release-16 work, we propose to introduce simplified 802.1Qbv support for 5GS using "exclusive gating mechanism" (protected traffic class). Exclusive gating means that at a given time only one gate is open (only the frames belonging to a single Traffic Class can be transmitted), resulting that the operation of Transmission Selection algorithm (specified in 802.1Qbv, for selecting the frames to be transmitted if multiple gates are open) is not required on the egress ports of the 5GS bridge. We also propose that the execution/operation of output pacing/scheduling for 802.1Qbv support (e.g. implementation of Qbv scheduling state machines) should be out of 3GPP scope. As a result, the TSN CNC only needs to exchange configuration parameters with relevant 5GS nodes.

The 802.10bv information exchange between 5GS and CNC involves two procedures:

5GS virtual bridge capabilities reporting.

TSN bridge configuration for 5G virtual bridge

5GS virtual bridge capabilities reporting

The following parameters specified by the 802.1Qbv are used to explore the 5GS virtual bridge capabilities by the CNC.

1. TickGranularity: This parameter defines the clock accuracy of the entity which operates the 802.1Qbv gating control (output pacing). Practically, it gives the minimum value of the TimeIntervalValue.

2. ExclusiveGating: This parameter is used to inform CNC that current bridge is restricted to ExclusiveGating or not. CNC then can use the information while the gate operations are calculated. Therefore, this parameter is proposed to indicate for the CNC that exclusive gating must be considered at the egress ports of the 5GS virtual bridge.

Figure 6:
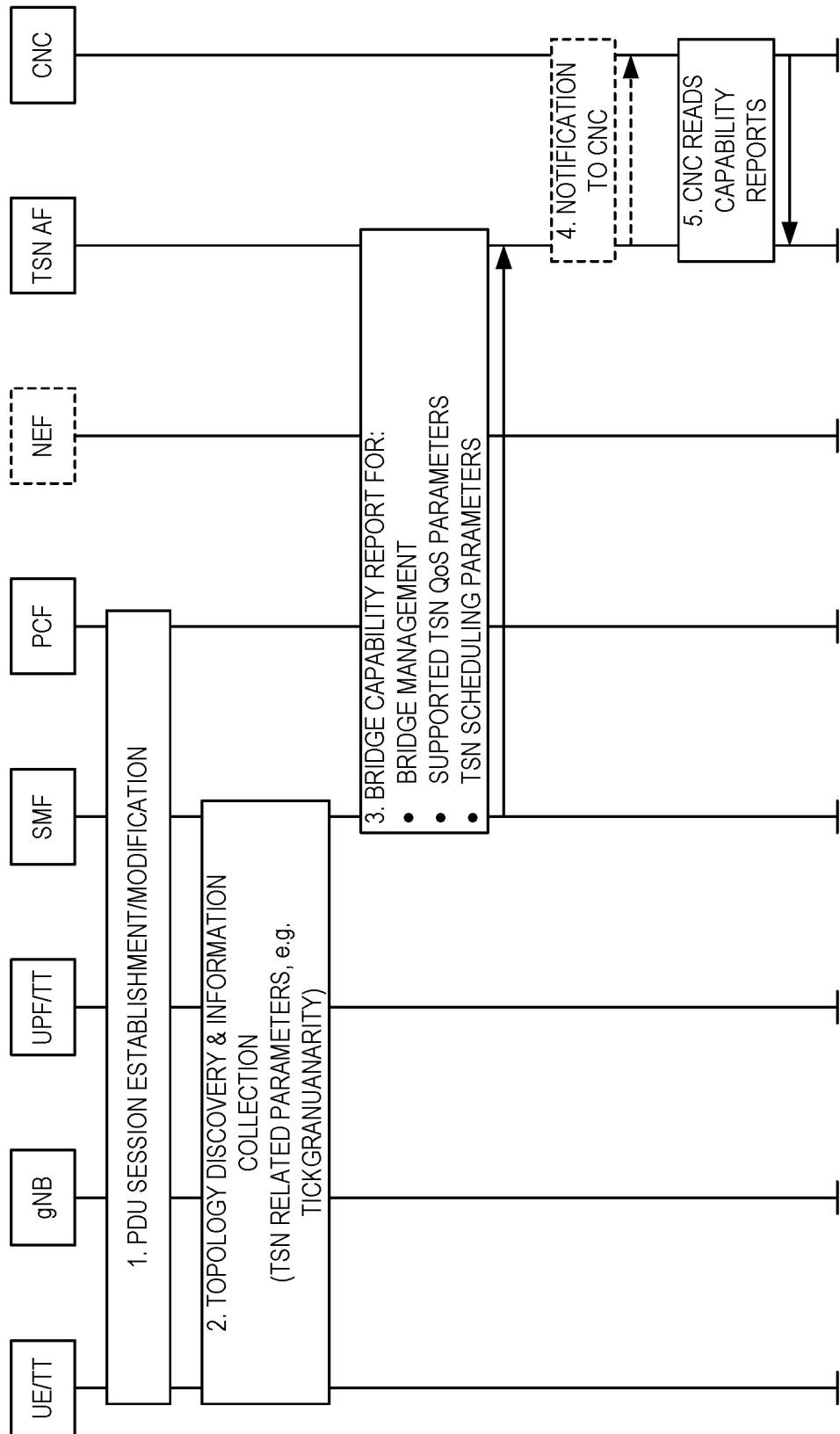
FIG. 6 illustrates a process for 5GS virtual bridge capabilities reporting in accordance with an embodiment of the present disclosure.

See FIG. 6

1. Based on UE request or trigged via network, a PDU session is established. If the PDU session is to be connected to aTSN, up to 8 GBR QoS flows are configured for the TSN traffic classes according to UE subscription, operator's policy or pre-configuration. The QoS flows may not been established until CNC indicates the resource reservation for arriving streams.

2. Based on the request from SMF, TSN translators in UE side and UPF side collect the network topology, propagate delay and TSN related information.

3. The TSN bridge management information (bridge ID, port ID), supported QoS parameters for TSN and scheduling parameters are reported to TSN AF based on SMF event notification (directly or via NEF).

For TSN scheduling parameters, in a downlink direction, the UE or UE side translator is the egress port of the 5GS, therefore operates the 802.1Qbv gate scheduling. The "TickGranularity" can be passed from UE to TSN AF by using existing 3GPP procedures, e.g. PDU session establishment/modification procedure. the UE sends the information to the AMF via NAS signalling, the AMF conveys information to the SMF, and the SMF forward it to TSN AF via event notification procedure. In an uplink direction, the UPF or UPF side translator performs the 802.1Qbv output pacing. The "TickGranularity" can be passed from UPF to AF by using existing 3GPP procedures, e.g. N4 session establishment/modification procedure (UPF to SMF), event notification procedure (SMF to NEF and AF).

The ExclusiveGating parameter can be stored in AF, and linked with bridge ID and port ID, so that CNC can read it, then make relevant calculation and configuration later.

The capability reports for TickGranularity and ExclusiveGating can be also stored in the PCF optionally. SMF can propagate the information to PCF via Session Management Policy Modification procedure.

4. Optional: TSN AF may notify CNC to read the capacity report. E.g. when bridge capability change/update events happen.

5. CNC reads the capability report from 5GS virtual bridge(s).

TSN bridge configuration for 5GS virtual bridge

The following parameters specified by the 802.1Qbv shall be provided by from CNC to 5GS, by configuring the output pacing. The parameters are handled by the AF and if needed translated for the output pacing mechanism implemented by the TSN Translator (the translator can be either an independent unit or integrated with UE or UPF).

1. AdminControlList: This parameter describes sequence of gate operation states in a list of GateControlEntries. The GateControlEntries consist of:
    GateStatesValue: this is a list up to 8 tuples, one for each traffic class supported by the current port. One entity of the list indicates a value, "open" or "closed" of the port's queues. GateStatesValue specifies the state of the gates at any given time.
    TimeIntervalValue: This specifies the time while the current states of the gates shall be applied; if the time specified by TimeIntervalValue expired, the next gate operation is executed. The sum of TimeIntervalValues determines the gating cycle time (after a cycle, the first operation in the gate control list is executed again)
2. AdminBaseTime: it specifies when a gating cycle shall be started to execute.

They provide the proper operation of the output pacing mechanism. The entries in the AdminControlListobviously specifies which queue can be served by the output pacing at a given time. Assuming that 5GS and TSN is properly synchronized, the output pacing can determine when execution of gating cycle shall be started.

Figure 7:
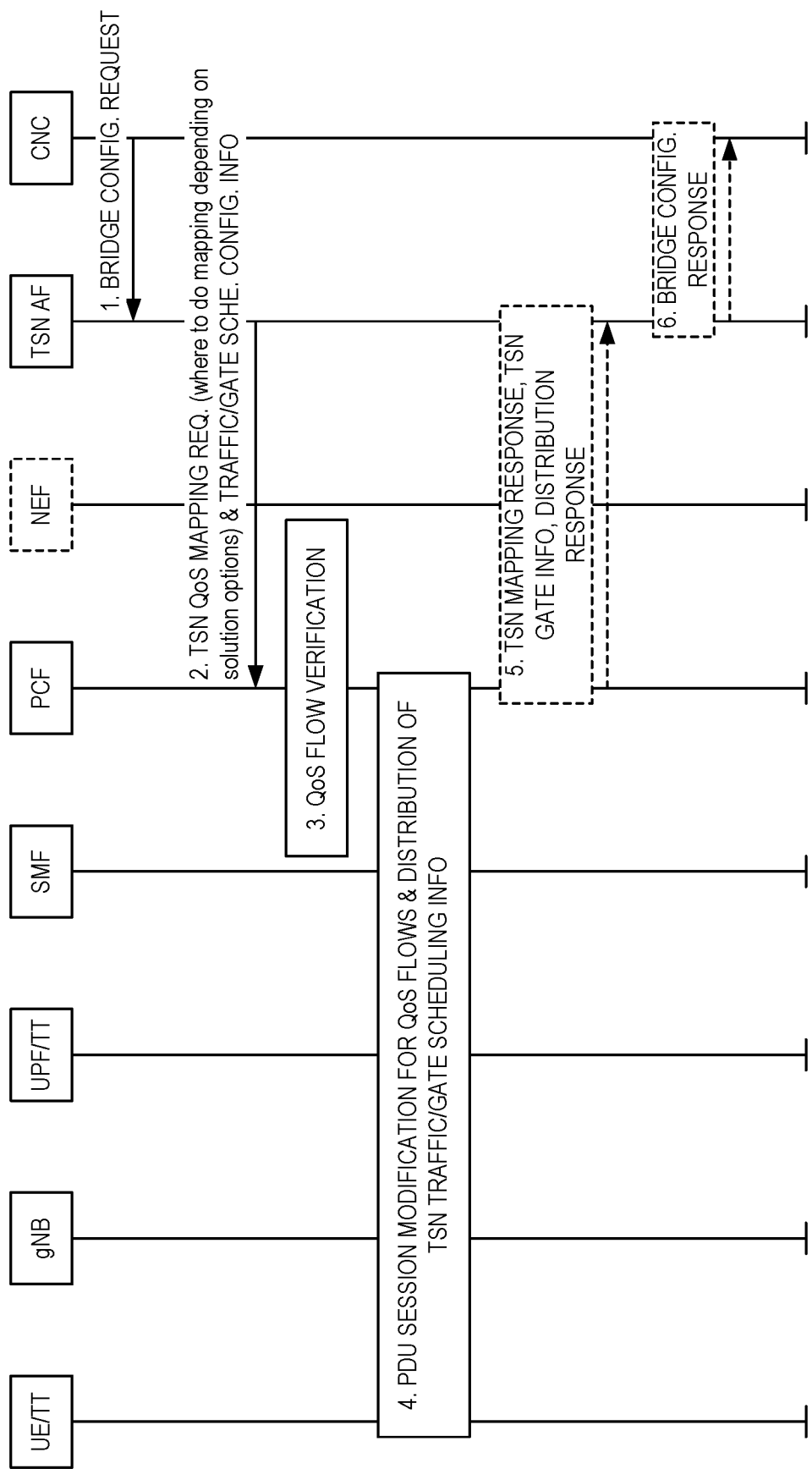
FIG. 7 illustrates a process for 5GS virtual bridge configuration in accordance with an embodiment of the present disclosure.

See FIG. 7

The figure is related to both QoS mapping and distribution of TSN scheduling information, however the description below will only be related to the distribution of TSN scheduling information.

1. Based on the stream requirements from End Stations, the CNC computes a transmission schedule and network paths. CNC distributes the TSN QoS requirements and traffic class characteristics (specific for current node) to 5G virtual bridge via TSN AF. Alternatively, the 5GS virtual bridge may pre-request or query CNC for the TSN QoS and traffic information. The 802.1Qbv gate control parameters (AdminControlList and AdminBaseTime) are provided by CNC as part of bridge configuration request in the step 1.
2. TSN AF also requests PCF to distribute the traffic/gate scheduling information to the corresponding 5GS egress port. QoS mapping part procedure is introduced in 5G-TSN QoS mapping framework section below (i.e., Section III).
3. QoS mapping part procedure is introduced in 5G-TSN QoS mapping framework section below (i.e., Section III).
4. As for the distribution of the TSN traffic/gate scheduling information, in a downlink direction, PCF distributes TSN traffic class characteristic to UE via SMF, e.g. NAS signaling at PDU session setup/modification procedure. A new information element may be added to provide TSN traffic class characteristic, then UE can forward the TSN traffic class characteristics to UE side translator.
    In an uplink direction, PCF distribute TSN traffic class characteristics to UPF via SMF, e.g. 3GPP signaling at PDU session establishment/modification procedure, N4 session establishment/modification procedure. A new information element may be added to provide TSN traffic class characteristics. UPF side translator can get the traffic class characteristics from UPF and perform output scheduling/pacing at the egress port.
5. Optional: PCF response to TSN AF (directly or via NEF).
6. Optional: TSN AF response to CNC.

End of Changes

III. TSN-5GS QoS Parameters Mapping a. Abstract

This section discusses the issues of QoS mapping between the 5GS and TSN. A way to perform the QoS parameter mapping and matching among these two networks, where the 5GS is modeled as a virtual bridge, is proposed.

b. Introduction

In this section, we discuss: (i) why we must configure connections based on every bridge port pair traffic class, (ii) how the traffic class can be mapped with the relevant/selected set of 5G QoS Indicators (5QIs), and (iii) how to obtain the necessary data to configure connections in the 5GS from the configuration information that the CNC sets in every 5G virtual-bridge port.

This section provides details on how to perform the QoS mapping while being compliant with the input and output information required in the TSN. Also, this section proposes a feedback approach in order to match the reported/exposed information to the TSN and the received configuration information from the CNC. In this way, the 5GS will configure connections internally only according to the requirements.

c. Discussion

3GPP TR 23.734 Solution #18 described QoS negotiation between 3GPP and TSN networks. The control plane based QoS negotiation includes two stages: TSN capabilities reporting for the 5GS TSN bridge (see 3GPP TR 23.734, section 6.18.1.2.1), and "TSN-aware QoS profile generation" (see 3GPP TR 23.734, section 6.18.1.2.2). Solution

30 in 3GPP TR 23.734 proposed a procedure of "TSN related QoS configuration for 5G virtual bridge" which can be an alternative to the "TSN-aware QoS profile generation" (see 3GPP TR 23.734, section 6.18.1.2.2). This procedure suggested a framework to divide TSN related QoS configuration for the 5G virtual bridge into two parts:
1. TSN QoS characteristics, which include QoS parameters for TSN traffic transmission, such as latency of TSN bridge, bandwidth information, priority level of TSN streams, etc. This information can be mapped into QoS parameters in 5G QoS flows.
2. TSN traffic pattern, which includes information for TSN supporting, such as a gate control mechanism scheduling TSN traffic, etc. This information is identified as additional parameters for 5GS to fulfill the QoS requirement of TSN communications, which is not included in the 5G QoS model.

This section provides an update of Solution #30. In particular, the section provides a minimal set of TSN QoS parameters that need to be mapped to 5G QoS.

i. Set of QoS Parameters Required by TSN

Any TSN bridge has a set of objects, which are parameters that can be accessed by a network management entity. In this section (i.e., section III), we assume the use of a fully centralized TSN model, so the CNC is the network management entity. These parameters can be read-only (R) or read-and-write (R/W) type. Among those, we have selected the ones related to QoS in order to generate a mapping in the 5GS. This mapping of these parameters in 5GS is useful to configure the traffic flows according to the QoS requirements in the 5GS.

In the following table, we present the selected TSN bridge objects and parameters and their type (R/W or R) and description taken from IEEE 802.1Q and IEEE 802.1Qcc.

| TSN parameter | Type | Description |
| --- | --- | --- |
| traffic-class-table | R/W | Each frame is mapped to a traffic class using the Traffic Class Table for the Port and the frame's priority. Structure: (a) Number of traffic classes, (b) enumeration of traffic classes, (c) respective priority (or set of priorities) per traffic class. |
| adminIdleSlope (from Bandwidth Availability Table) | R/W | In the fully centralized model of TSN configuration, the CNC entity can use adminIdleSlope to reserve the bandwidth, in bits per second, of the queue associated with traffic class N. (NOTE: This parameter can be manipulated to change the overall amount of bandwidth available to send traffic on a Port, in a network where SRP is not used for stream reservations.) |
| pcp-encoding-table | R/W | The priority and drop_eligible parameters are encoded in the PCP (Priority Code Point) field of the VLAN tag using the Priority Code Point Encoding Table for the Port |
| pcp-decoding-table | R/W | The PCP can be decoded to the priority and drop_eligible parameters using the Priority Code Point Encoding Table for the Port. |
| transmissionSelectionAlgorithm (from Transmission Selection Algorithm Table) | R/W | Assigns for each traffic class that the Port supports, the transmission selection algorithm that is to be used to select frames for transmission from the corresponding queue. Strict priority is the default |
| use_DEI | R/W | The drop_eligible parameter may also (besides PCP) be encoded in and decoded from the Drop Eligible Indicator (DEI) in the VLAN tag. If the Boolean parameter use_DEI is TRUE, then it is possible to use the DEI in the VLAN tag to convey eight distinct priorities, each with a DEI. |
| defaultPriority | R/W | Default priority of a queue. Modified in some special cases. Note: This parameter is used when untagged frame is received by UE being edge port. |
| priority-regeneration-table | R/W | Under normal circumstances, priority is not modified in transit through the relay function of a Bridge; however, there may be some circumstances where it is desirable for management purposes to control how priority is propagated. In its default state, the Regenerated priority is identical to the incoming priority. |
| independentDelayMin/Max | R | Minimum/Maximum delay independent of the frame length (per port and per traffic class). |

-continued

| TSN parameter | Type | Description |
| --- | --- | --- |
| dependentDelayMin/Max | R | Minimum/Maximum delay dependent of the frame length (per port and per traffic class). The length-dependent delay typically includes the time to receive and store each octet of the frame, which depends on the link speed of the ingress Port. |
| txPropagation Delay | R | The transmission propagation delay along the network media for a frame transmitted from the specified Port of this station to the neighboring Port on a different station, (per port). |

Note that, in some embodiments, the parameters may also include dependentDelayMin/Max and txPropagationDelay. The calculation of these parameters may be, e.g., left to the particular 5G implementation. Note that "length-dependent delay attribute specifies the time for a single octet of the frame to transfer from ingress to egress".

In principle, "R" parameters can be reported by any bridge to the CNC as part of TSN capabilities reporting for 5GS TSN bridge (3GPP S1-183120: "cyberCAV—5G in Industrial Automation: Different and Multiple Time Domains for Synchronization", section 6.18.1.2.1). Note, however, that the direction of the information between bridges and the CNC is that the CNC reads the managed objects and the parameters. However, the bridge may indicate that there was some change in the managed object, which may trigger the CNC to read it (again). "W" parameters can be used for bridge configuration, in the context of 5GS-TSN integration, it can be part of the "TSN-aware QoS profile generation" procedure (3GPP TR 23.734 DRAFT V16.0.0+(20198-102): "Study on 5GS Enhanced support of Vertical and LAN Services", section 6.18.1.2.2) or "TSN related QoS configuration for 5G virtual bridge" procedure in solution #30. All R/W parameters are related to both capability report and bridge configuration procedure.

Some parameters are rarely changed, such as defaultPriority and the priority regeneration table. The latter could be necessary to adjust the 5GS virtual bridge, in the case it is at the edge of the TSN and interacting with other non-TSN-aware bridges/end stations.

In the time-gated scheduling scenario, the transmission selection algorithm plays a role when more than one gate is open at the same time. Note that there is one time-gate per queue. If Strict Priority is the applied transmission selection algorithm, then the frames are selected for transmission based on their priority. If the number of TCs (declared number of queues per port) used is less than eight (maximum), then each class may map more than one priority value for frames. It is recommended to map the priority to TCs as defined in Table 8-5 of the IEEE 802.1Q standard.

Port Control Protocol (PCP) is encoded at the source bridge component where the frame is originated, and any bridge in the communication path of this frame may decode the PCP to obtain the values of priority and drop-eligibility. These tables are general for the TSN system and can be used to extract information from the frame. Tables for coding and decoding are available in the standard. Another way to extract drop-eligibility is through the Drop Eligible Indicator (DEI) field of the Virtual Local Area Network (VLAN) tag. The bridge knows when to do so if the use_DEI parameter is TRUE.

In this discussion, we focus on the following parameters to be mapped in the 5GS: TC table (number of TCs, TC enumeration, and their corresponding priorities), independentDelayMax, independentDelayMin, dependentDelayMax, dependentDelayMin, and txPropagationDelay. In general, other parameters can be as well mapped using the same technique proposed herein.

Figure 8:
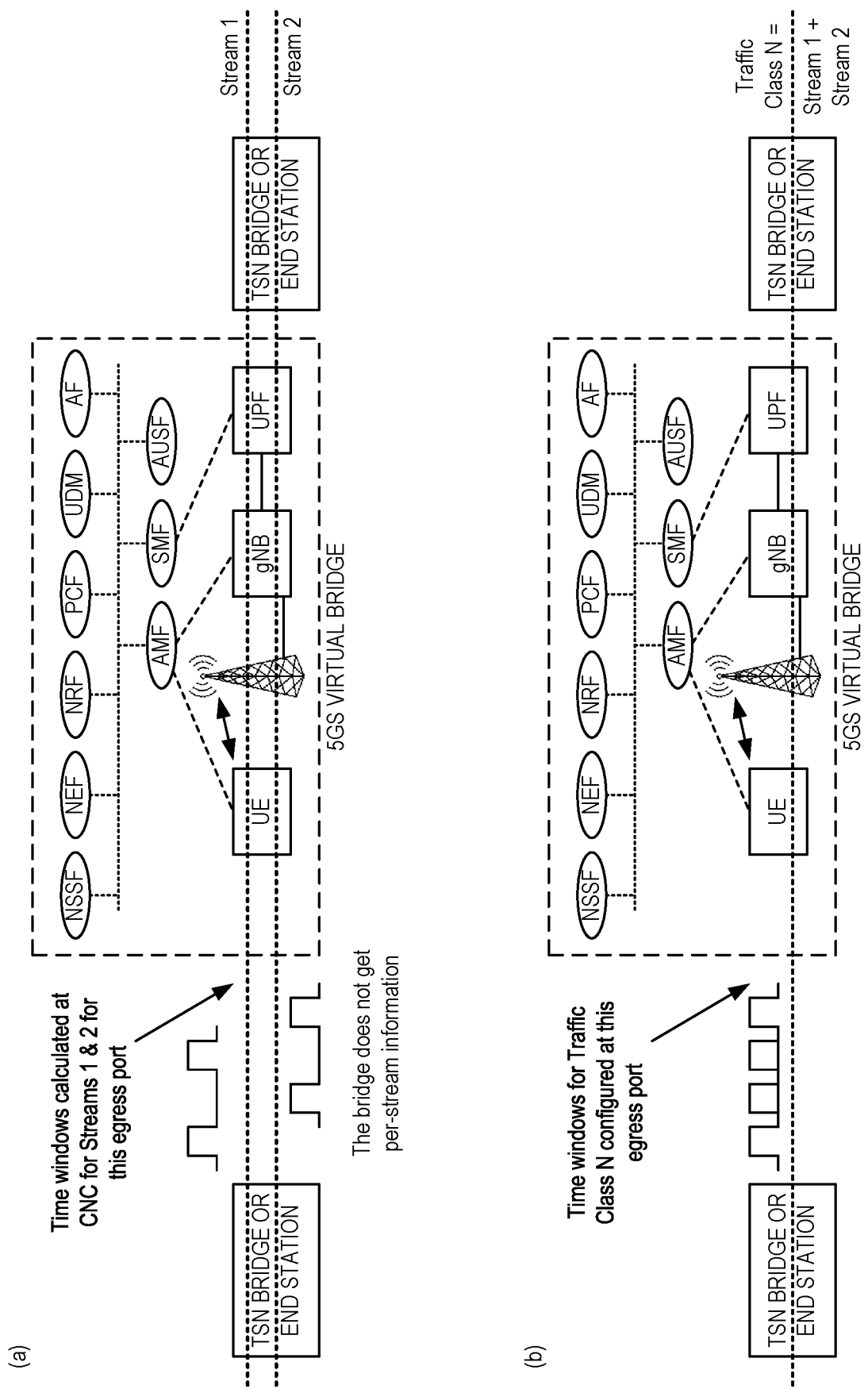
FIG. 8 illustrates an example of information released by a Centralized Network Controller (CNC) of a TSN network, where in part (a) of FIG. 8 the configuration is calculated at the CNC per TSN stream and in part (b) the scheduling configuration is set in egress ports by the CNC per traffic class, in accordance with an embodiment of the present disclosure.

It is important to notice that the configuration information set by the CNC is based on TCs of the bridged network. As indicated in FIG. 8, although the CNC performs calculations to set up every single TSN stream, the information provided to bridges is based on the TCs per port. Also, the information to be reported to the CNC is by standard using a per-TC basis. Therefore, the QoS mapping between the TSN and 5GS should be focused on TCs, and not on a per-TSN-stream basis.

Regarding FIG. 8(b), note that, as an alternative to the scheduling configuration being set in egress ports by the CNC (per TC), the gate could be open for long enough to send frames of both streams instead of opening the gate for each packet separately. This depends on how close the frames follow each other in time. This is up to the CNC to decide what scheme to use.

In accordance with the description above, one proposal made herein can be summarized as:

Proposal 2.1: To choose a minimum set of TSN QoS-related parameters that are relevant for mapping the QoS requirements in the 5GS: TC table (number of TCs, TC enumeration, and their corresponding priorities), independentDelayMax, independentDelayMin, dependentDelayMax, dependentDelayMin, adminIdleSlope, and txPropagationDelay. The following parameters: independentDelayMin, dependentDelayMax, dependentDelayMin, adminIdleSlope, and txPropagationDelay, are left to the 5G implementation.

Note: the independentDelayMax can be mapped to 5GS Packet Delay Budget (PDB) which can be used by the de-jitter buffer as described in 3GPP paper S2-1901150. The de-jitter buffer size at every egress port can be set based on the independentDelayMax value.

ii. TSN QoS Mapping Framework in 5GS

The TSN QoS mapping framework between the 5GS and CNC involves two phases:

1. providing 5GS virtual bridge capabilities, and
2. TSN bridge configuration for the 5GS virtual bridge.

1. Providing 5GS Virtual Bridge Capabilities

Before a TSN stream is configured by the CNC, it must first get network capabilities, topology, and delay information from every bridge. The CNC needs this information to perform the path and scheduling calculations. The 5GS virtual bridge must also provide such information. In this discussion, we pay special attention to the QoS related information.

Figure 9:
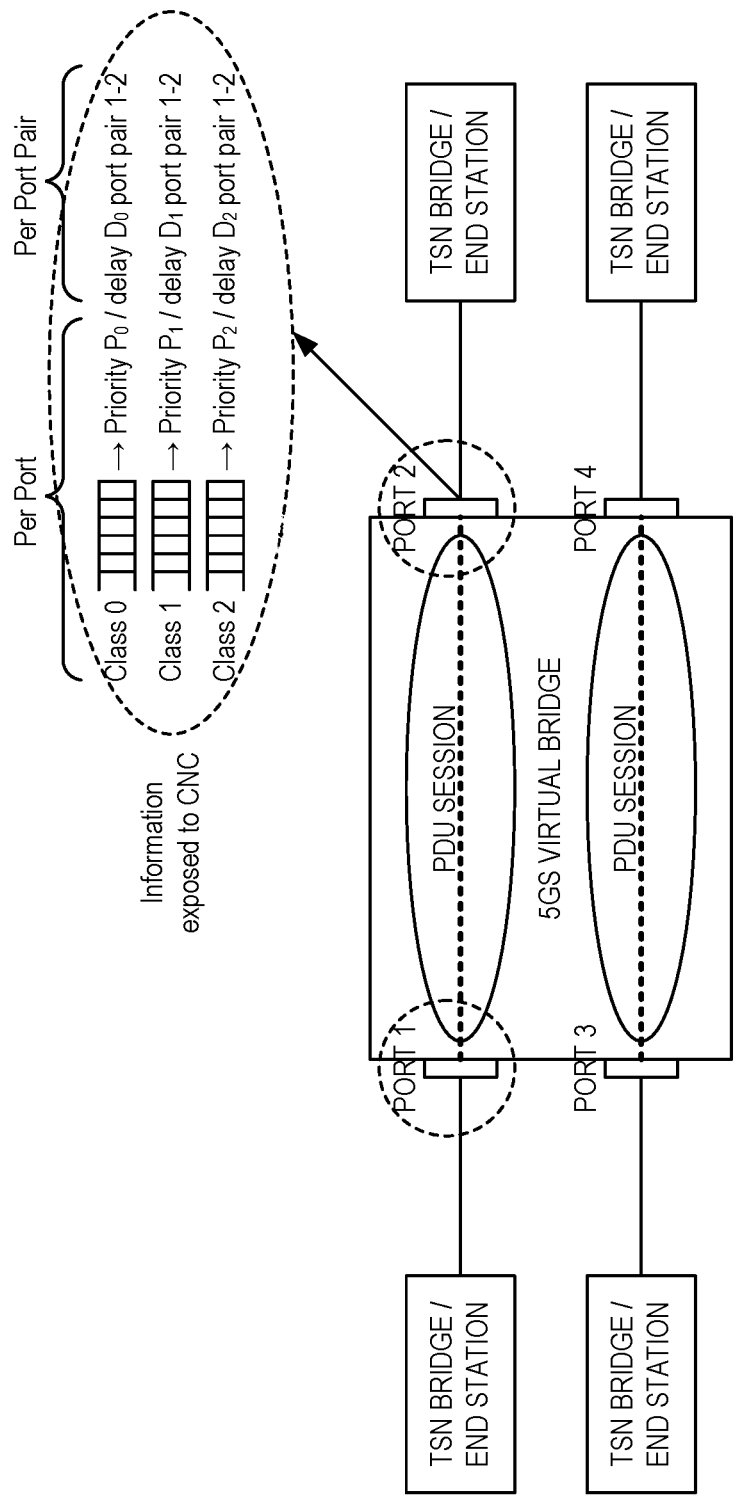
FIG. 9 illustrates an example of information reported to the CNC per traffic class in accordance with an embodiment of the present disclosure.

For example, FIG. 9 illustrates the way that information should be reported to the CNC. Every port reports the number of queues it handles, and the priority allocated to it. The bridge delays are reported per port pair and per TC.

For the QoS mapping between TCs and 5QIs, we propose to preserve the priority of the 5QI and match them to port TCs. To do so, the 5GS can choose up to eight TCs to be mapped. This decision is based on the factory needs and applications using TSN. The selection of up to eight 5QIs could include standard 5QIs or new 5QIs created to match the needs for deterministic services and Transformed Successive Cancellation (TSC).

Once the set of 5QIs to be used for TSN is set, then it is possible to enumerate as many bridge port TCs as the number of selected 5QIs. The lowest priority value in 5QI maps to the highest priority value of the port TC. The rest of the priorities in 5QIs are ordered in ascending values, and the port TCs are ordered in descending values. Note that the referred Table 805 of IEEE 802.1Q does not apply strict ordering, default is changed. Actual priority values are up for discussion in International Electrotechnical Commission (IEC)/IEEE 60802, and that scheme can be applied once it is determined. In this way they are matched one to one, while preserving the 5QIs priority levels. In FIG. 10, we can see an example of mapping, where 5QI 85 with priority 21 (the lowest value of the selected 5QIs in this example) is mapped to the highest port TC priority 7. In this way, the next 5QI 83 with priority 22 is mapped to TC priority 6, and so on. With every row of this mapping table (FIG. 10), we include the parameters that are reported to the CNC as possible QoS classes that can be configured in the 5GS virtual bridge: Class, Priority, and independentDelayMax (which is mapped to PDB) mapped from the respective 5QI. Although the independentDelayMax here is per port pair, it is important to notice that both ports in the pair must expose the same value of this parameter. There are also parameters that are meaningful to the 5GS such as Packet Error Ratio (PER), Maximum Data Burst Volume (MDBV), and the averaging window. However, our focus is on priority and delay.

One proposal in accordance with the description above is summarized as:

Proposal 2.2: Generate a QoS mapping table between port TCs and 5QI matching the priority levels, preserving the priorities in the 5GS.

There are three options to consider regarding where to store the QoS related capability reporting:

1) At the PCF: Since the PCF already has all the 5QIs and their parameters, the mapping can be stored locally. In this way, no internal information on 5QIs is available to the TSN AF. Less 5GS information is exposed to the TSN AF. The PCF must be able to store and update the QoS mapping table.
2) At the TSN AF: Knowing the selected 5QIs to be used in TSN system, then the AF can directly hold the table and only report the mapped TSN QoS parameters. There is no need to modify any 5GS function; however, the TSN AF must hold all 5QI information.
3) At both the PCF and the TSN AF: The PCF has a mapping of the 5QIs to the TSN TC. Then the AF has a partial mapping of the TSN TCs to priority and delay, which is just the information that needs to be exposed. Tables in both locations must match and must be updated in case of changes. Here the AF has a simpler table. The PCF also has a very simple key parameter from TSN (TC) to map the 5QIs.

2. TSN Bridge Configuration for 5GS Virtual Bridge

Once the CNC has received the necessary information, it proceeds to calculate scheduling and paths. The configuration information is set in the bridge per port and per TC. The most relevant information received is the scheduling for every TC and port of the bridge. At this point, it is possible to retrieve the real QoS requirements by identifying the TC of the port. Then the TC to 5QI mapping can be performed using the QoS mapping table. Subsequently, the real traffic flow can be configured using the 5QI that we have retrieved from the QoS mapping table. We name this process the feedback method, because it uses the reported information to the CNC and the feedback of the configuration information coming from the CNC to perform the mapping and configuration in the 5GS. The scheduling configuration information per TC is mapped to trigger creation/modification of a QoS flow in 5GS.

One proposal in accordance with the description above is summarized as:

Proposal 2.3: The mapping of real QoS requirements in 5GS is performed by combining the reported and configuration information, using a feedback approach.

We propose that the AF will obtain the information from the CNC and extract which TC(s) were configured per port pair, and will retrieve the corresponding QoS requirement(s). In our example, the QoS requirement is the delay per port pair per TC. Then a QoS mapping between the TCs and the QoS traffic profiles (5QIs) will take place. Depending on the aforementioned three different capability reporting options, there are three QoS mapping options in the configuration phase:

1) The PCF performs the QoS mapping as it holds the QoS mapping table.
2) The TSN AF performs the QoS mapping as it holds the QoS mapping table.
3) Both the PCF and TSN AF perform a partial QoS mapping. In the AF the QoS mapping table contains the TC, priority, and delay. Then it sends the TC to the PCF, which uses this information as an index to map with the 5QIs it holds. Communication between the two entities is necessary for QoS mapping.

One proposal in accordance with the description above is summarized as:

Proposal 2.4: AF will extract the QoS requirements from the scheduling configuration information coming from the CNC for a specific port pair and a TC. Then, the QoS mapping is performed at the function entity(ies) (PCF or/and TSN AF) that holds the QoS mapping table.

If the scheduling is set using exclusive gating (only one TC gate is open at any transmission time window, option available in the IEEE 802.1Q standard, Annex Q), real RC QoS requirements can be retrieved from the scheduling sent in the configuration information. For example, for a TC N, we know the duration of every time window when the gate is open, and the port's cycle time. This can lead to the calculation of the real required bandwidth:

$$\text{Bandwidth\_for\_traffic\_class\_N} = \sum_{time\_window_i} \left( \frac{time\_window\_size_i}{cycle\_duration} \right) * port\_bit\_rate$$

Then, the QoS flow in the 5GS can be configured using the above bandwidth as GPR. The GPR could be updated with changes in the scheduling for this TC.

Also, the traffic pattern of the TC is given in the scheduling information. It is possible to extract the maximum time window size (translates to the maximum burst size), and in some cases the periodicity.

One proposal in accordance with the description above is summarized as:

Proposal 2.5: More QoS relevant information can be extracted from the scheduling configuration information received from the CNC if the scheduling for the 5GS virtual bridge is set with exclusive gating.

d. Procedures

Now, more details are provided regarding the procedures to follow in the 5GS. Note that the focus is on the QoS mapping, so other types of mapping and reporting may be omitted. For the capability reporting phase, we assume the QoS mapping tables have been preconfigured via Operations and Management (OAM).

i. Option 1

Option 1 involves storing the QoS mapping table at the PCF.

Figure 11:
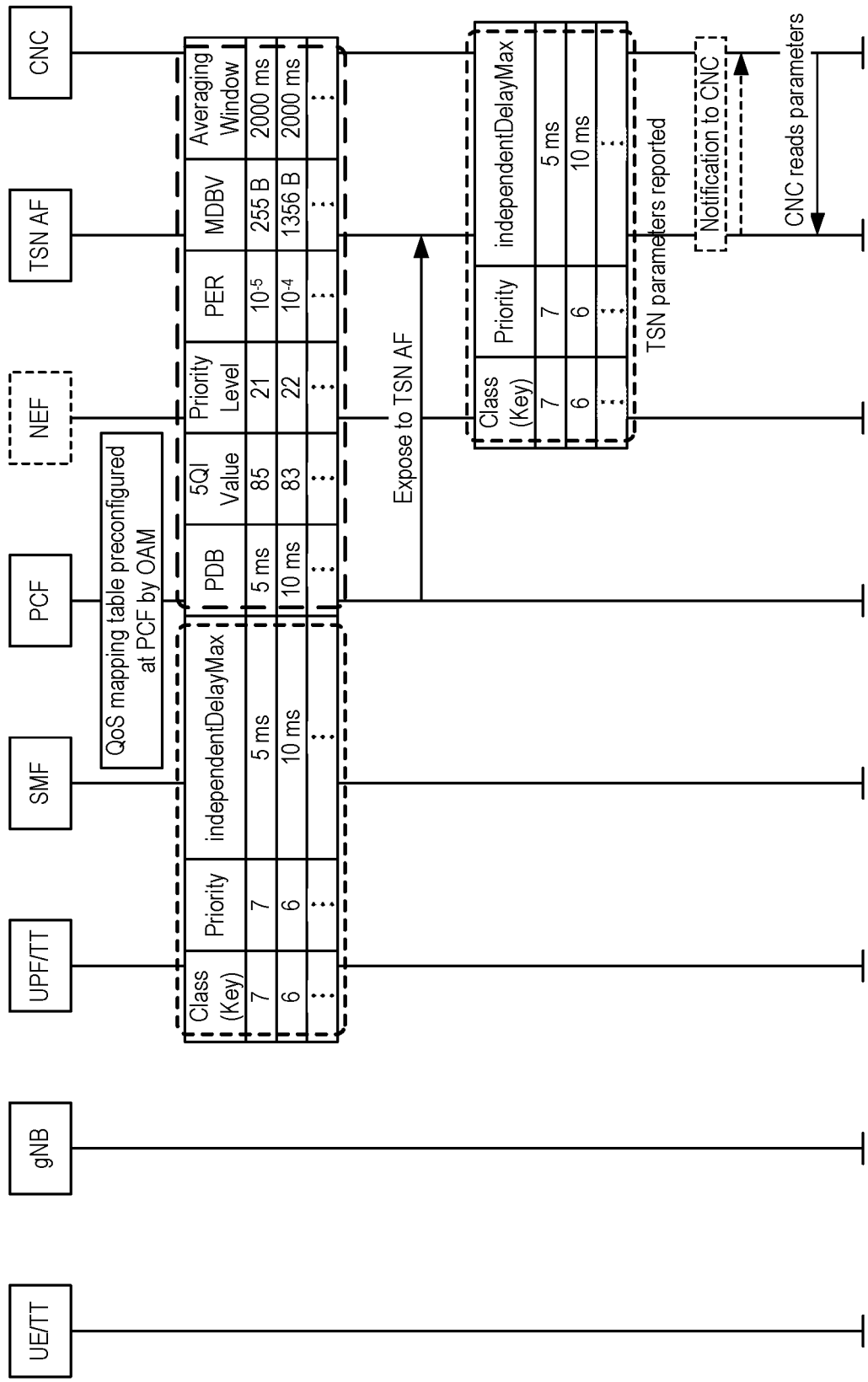
FIG. 11 illustrates a process for TSN Quality of Service (QoS) capability reporting in accordance with a first option, in accordance with an embodiment of the present disclosure.

QoS Capability Reporting Phase (Option 1):

In FIG. 11, we show the preconfigured QoS table in the PCF. The table that appears at the TSN AF represents what is being reported or exposed to the CNC through the relevant TSN information objects, such as the Traffic Class Table for every port. Note that, since the QoS mapping table is at the PCF, the relevant TSN information needs to be exposed to the TSN AF. Then the CNC can read this information whenever needed.

Note: If there is a need to introduce a new 5GS QoS profile (e.g., use-case specific 5QI), then the new 5QIs can be preconfigured and added at the PCF by the OAM.

The table in FIG. 11 is an example to show the principle that other parameters used for mapping/capability report should work in a similar way.

Figure 12:
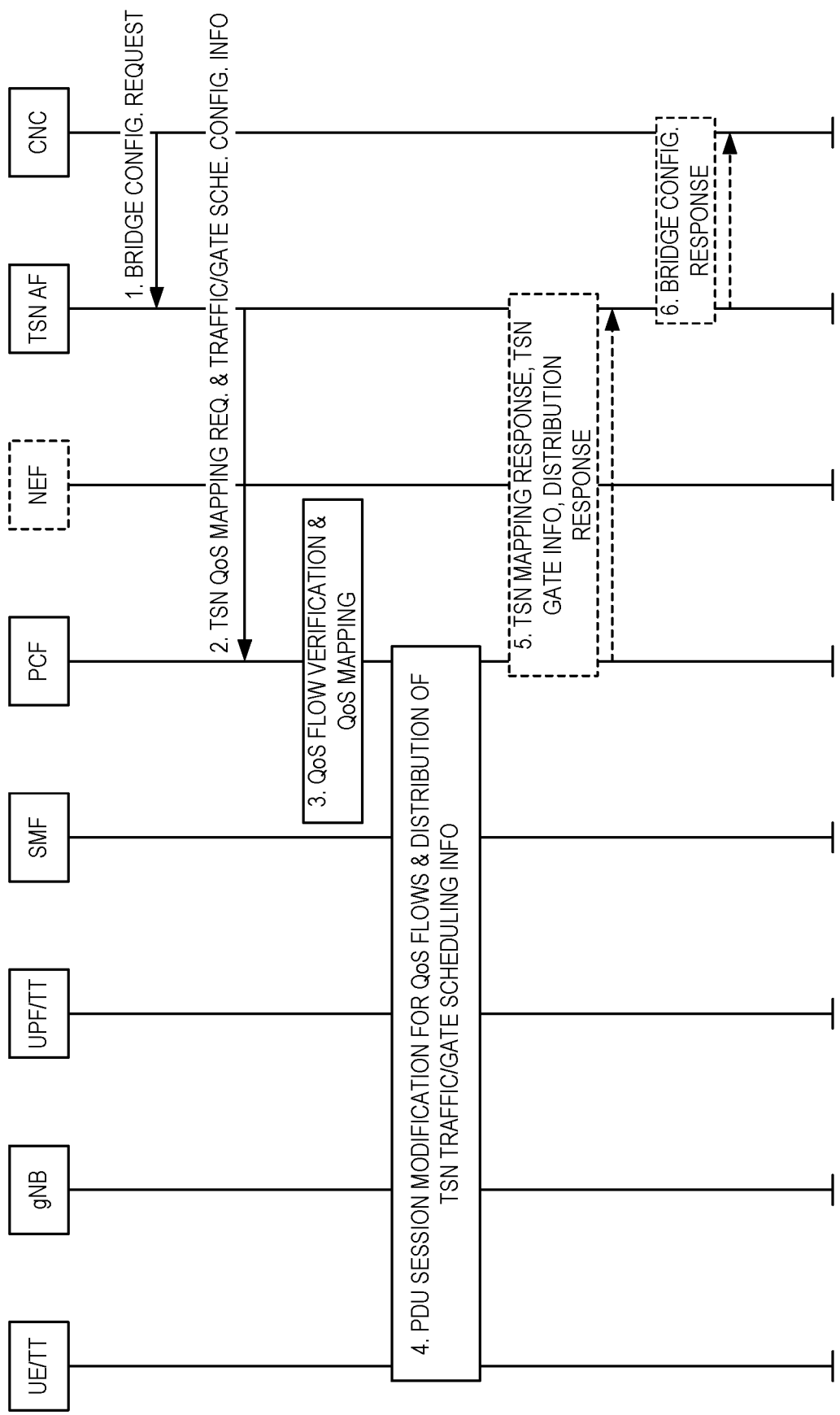
FIG. 12 illustrates a process for TSN QoS configuration in accordance with the first option, in accordance with an embodiment of the present disclosure.

QoS Configuration Phase (Option 1):

See FIG. 12.

1. Based on the stream requirements from End Stations, the CNC computes a transmission schedule and network paths. The CNC distributes the TSN QoS requirements and traffic pattern (specific for the current node) to the 5G virtual bridge via the TSN AF. Alternatively, the 5GS virtual bridge may pre-request or query the CNC for the TSN QoS and traffic information.
2. The TSN AF extracts QoS requirements and traffic characteristics, and then forwards them to the PCF (directly or via the NEF). Meanwhile the TSN AF also requests the PCF to distribute the traffic/gate scheduling information to the corresponding 5GS egress port.
3. The PCF finds/maps suitable 5G QoS policies and rules, using its QoS mapping table. The PCF verifies that the QoS flow serving for the requested TC can be supported in 5GS.
4. A PCF may trigger the PDU session modification procedure to establish a new 5GS QoS flow for the requested TC according to the selected QoS policies and rules. If the QoS flow serving the requested TC already exists, the SMF doesn't establish any new QoS flow but binds the new stream traffic into the existing QoS flow for the TC. The SMF configures the UE, gNB, and UPF for QoS enforcement according to existing 3GPP procedure (see 3GPP TS 23.501 clause 5.7).

As for the distribution of the TSN traffic/gate scheduling information, in a downlink direction, the PCF distributes TSN traffic/gate scheduling information to the UE via the SMF, e.g. NAS signalling at PDU session setup/modification procedure. A new information element may be added to provide TSN traffic pattern information which is associated to a Quality of Service Flow Identifier (QFI), then the UE can forward the TSN traffic pattern to a UE side translator. In an uplink direction, the PCF distributes TSN traffic/gate scheduling information to the UPF via the SMF, e.g. 3GPP signalling at PDU session establishment/modification procedure, N4 session establishment/modification procedure. A new information element may be added to provide TSN traffic pattern information which is associated to a QFI. A UPF side translator can get the traffic pattern for a specific TSN flow from the UPF and perform output scheduling/pacing at the egress port.

5. Optional: The PCF may respond to the TSN AF (directly or via the NEF).
6. Optional: The TSN AF may respond to the CNC.

ii. Option 2

Option 2 involves storing the QoS mapping table at the TSN AF.

Figure 13:
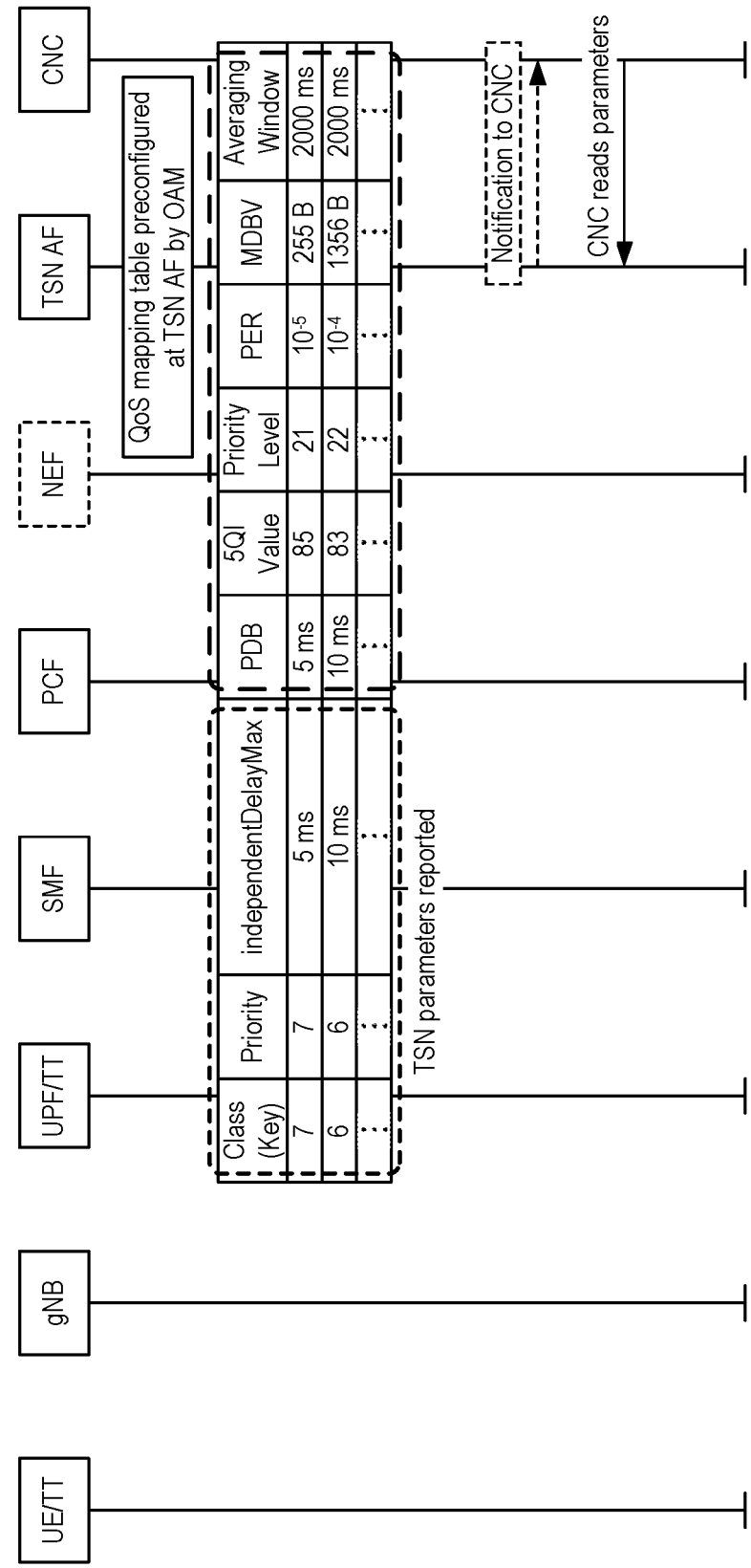
FIG. 13 illustrates a process for TSN QoS capability reporting in accordance with a second option, in accordance with an embodiment of the present disclosure.

QoS Capability Reporting Phase (Option 2):

In FIG. 13, we show the preconfigured QoS tables in the TSN AF. The table that appears at the TSN AF represents what is being reported or exposed to the CNC by the relevant TSN information objects, such as the Traffic Class Table for every port. The CNC can read this information whenever needed.

Note: If there is a need to introduce a new 5GS QoS profile (e.g., use-case specific 5QI), then the new 5QIs can be preconfigured and added at the PCF by the OAM.

The table in FIG. 13 is an example to show the principle that other parameters used for mapping/capability report should work in a similar way.

Figure 14:
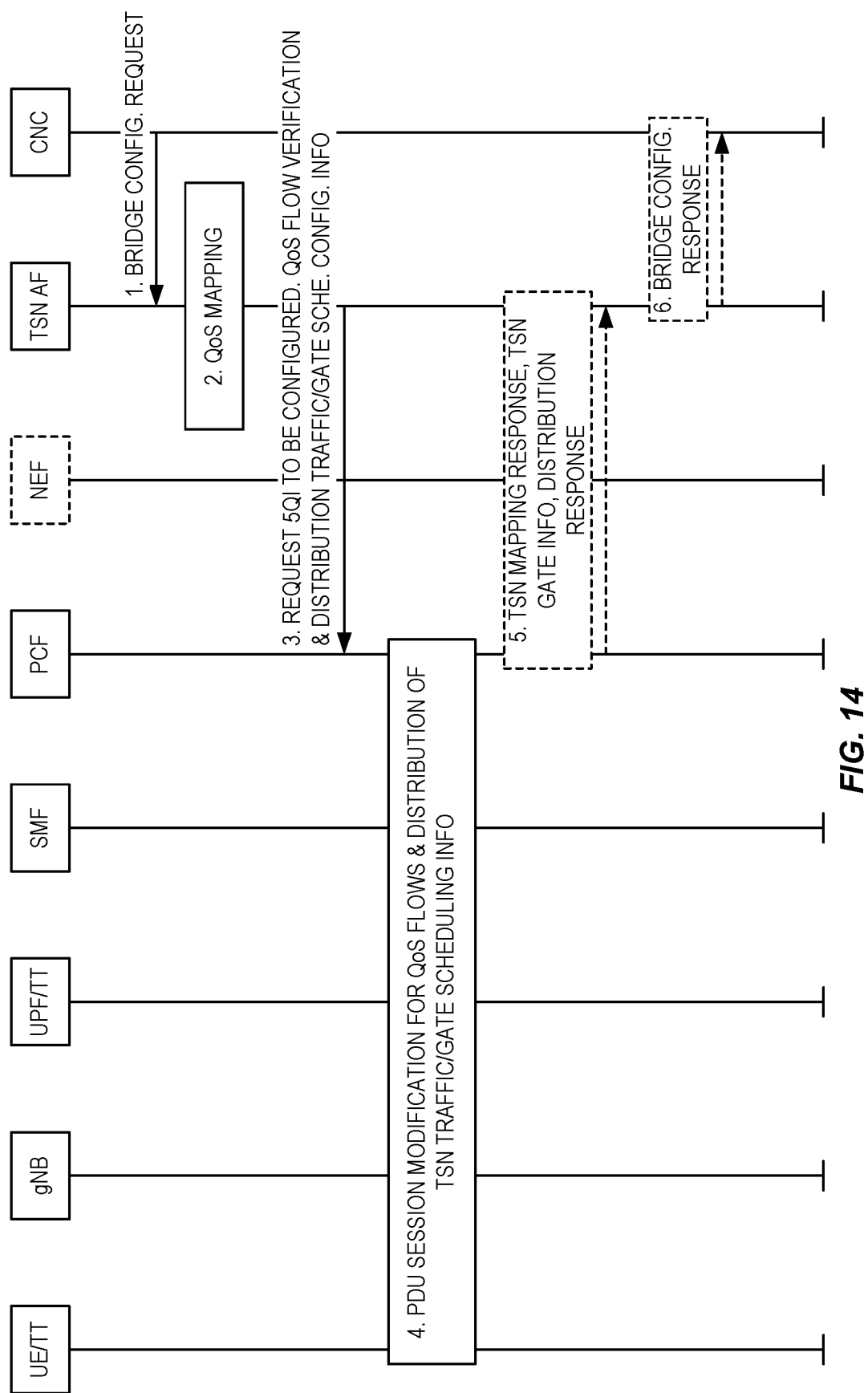
FIG. 14 illustrates a process for TSN QoS configuration in accordance with the second option, in accordance with an embodiment of the present disclosure.

QoS Configuration Phase (Option 2):

See FIG. 14.

1. Based on the stream requirements from End Stations, the CNC computes a transmission schedule and network paths. The CNC distributes the TSN QoS requirements and traffic pattern (specific for current node) to the 5G virtual bridge via the TSN AF. Alternatively, the 5GS virtual bridge may pre-request or query the CNC for the TSN QoS and traffic information.
2. Since the TSN AF has a full map of TSN QoS parameters and 5G QoS profile, the TSN AF performs the QoS mapping of the received TSN QoS configuration information into a selected set of 5QIs using its QoS mapping table.
3. The TSN AF sends the selected/mapped 5QI to the PCF (directly or via the NEF). The PCF may verify the availability of the requested 5QI. Meanwhile, the TSN AF also requests the PCF to distribute the traffic/gate scheduling information to the corresponding 5GS egress port.
4. A PCF may trigger the PDU session modification procedure to establish a new 5G QoS flow for the requested TC according to the selected QoS policies and rules. If the QoS flow serving the requested TC already exists, the SMF doesn't establish any new QoS flow but binds the new stream traffic into the existing QoS flow for the TC. The SMF configures the UE, gNB, and UPF for QoS enforcement according to existing 3GPP procedure (see TS 23.501 clause 5.7). As for the distribution of the TSN traffic/gate scheduling information, in a downlink direction, the PCF distributes the TSN traffic pattern to the UE via the SMF, e.g. NAS signalling at PDU session setup/modification procedure. A new information element may be added to provide TSN traffic pattern information which is associated to a QFI, then the UE can forward the TSN traffic pattern to a UE side translator.

In an uplink direction, the PCF distributes the TSN traffic pattern to the UPF via the SMF, e.g. 3GPP signalling at PDU session establishment/modification procedure, N4 session establishment/modification procedure. A new information element may be added to provide TSN traffic pattern information which is associated to a QFI. The UPF side translator can get the traffic pattern for a specific TSN flow from the UPF and perform output scheduling/pacing at the egress port.

5. Optional: The PCF may respond to the TSN AF (directly or via the NEF).
6. Optional: The TSN AF may respond to the CNC.

iii. Option 3

Option 3 has two stage mapping. It involves storing partial QoS mapping tables in both the PCF and TSN AF.

Figure 15:
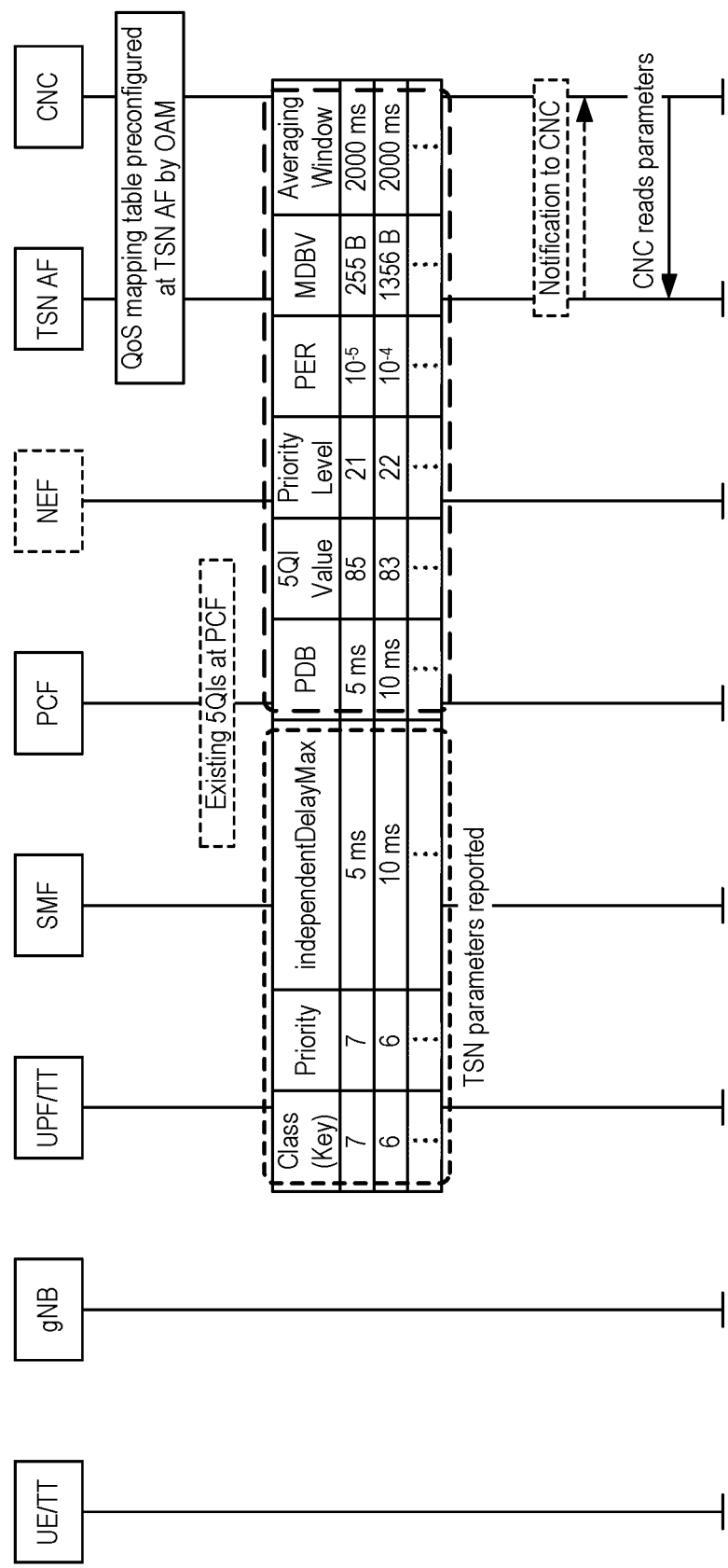
FIG. 15 illustrates a process for TSN QoS capability reporting in accordance with a third option, in accordance with an embodiment of the present disclosure.

QoS Capability Reporting Phase (Option 3):

In FIG. 15, we show the preconfigured QoS tables in the TSN AF. The table that appears at the TSN AF represents what is being reported or exposed to the CNC through the relevant TSN information objects, such as the Traffic Class Table for every port.

Option 3 has no impact on the PCF. The capability report in option 3 only involves the TSN AF. In FIG. 15, the table in the PCF is not a new table introduced at the PCF; it is the original 5GS QoS profile. The table is not specific for option 3; actually, it is also available in other options. We show it here because it simplifies the description of the QoS mapping mechanism.

Note: If there is a need to introduce a new 5GS QoS profile (e.g., use-case specific 5QI), then the new 5QIs can be preconfigured and added at the PCF by the OAM.

The table in FIG. 15 is an example to show the principle that other parameters used for mapping/capability report should work in a similar way.

Figure 16:
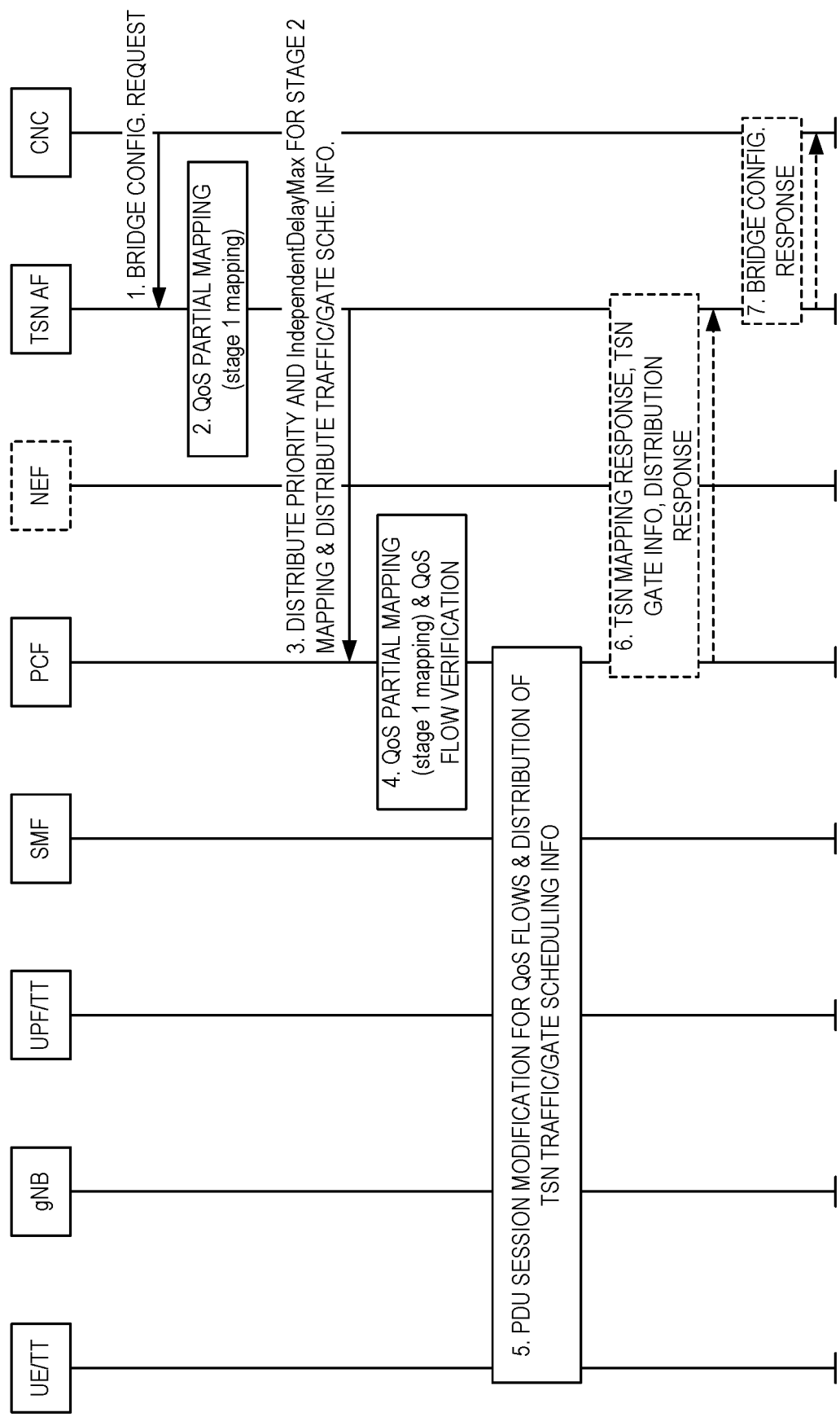
FIG. 16 illustrates a process for TSN QoS configuration in accordance with the third option, in accordance with an embodiment of the present disclosure.

QoS Configuration Phase (Option 3):

See FIG. 16.

1. Based on the stream requirements from End Stations, the CNC computes a transmission schedule and network paths. The CNC distributes the TSN QoS requirements and traffic pattern (specific for the current node) to the 5G virtual bridge via the TSN AF. Alternatively, the 5GS virtual bridge may pre-request or query the CNC for the TSN QoS and traffic information.
2. Stage 1 mapping: The TSN AF matches the received configuration to the TCs in its partial QoS mapping table. For example, according to the TSN TC number (as a search key), the AF finds the value of priority and independentDelayMax.
3. The TSN AF sends priority and independentDelayMax value to the PCF (directly or via the NEF). Meanwhile the TSN AF also requests the PCF to distribute the traffic/gate scheduling information to the corresponding 5GS egress port.
4. Stage 2 mapping: Based on the received priority and independentDelayMax value (as search keys), the PCF will search a suitable QoS profile (e.g., 5QI) to fulfill the requested priority and independentDelayMax.
5. The PCF may trigger the PDU session modification procedure to establish a new 5G QoS flow for the requested TC according to the selected QoS policies and rules. If the QoS flow serving the requested TC already exists, the SMF doesn't establish any new QoS flow but binds the new stream traffic into the existing QoS flow for the TC. The SMF configures the UE, gNB, and UPF for QoS enforcement according to existing 3GPP procedure (see TS 23.501 clause 5.7). As for the distribution of the TSN traffic/gate scheduling information, in a downlink direction, the PCF distributes the TSN traffic pattern to the UE via the SMF, e.g. NAS signalling at PDU session setup/modification procedure. A new information element may be added to provide TSN traffic pattern information which is associated to a QFI, then the UE can forward the TSN traffic pattern to a UE side translator.

In an uplink direction, the PCF distributes the TSN traffic pattern to the UPF via the SMF, e.g. 3GPP signalling at PDU session establishment/modification procedure, N4 session establishment/modification procedure. A new information element may be added to provide TSN traffic pattern information which is associated to a QFI. A UPF side translator can get the traffic pattern for a specific TSN flow from the UPF and perform output scheduling/pacing at the egress port.

6. Optional: The PCF may respond to the TSN AF (directly or via the NEF).
7. Optional: The TSN AF may respond to the CNC.

One potential benefit of the option 3 is that the PCF may have certain freedom to choose suitable 5QI for an incoming TSN QoS class request. FIG. 17 shows an example. The "TSN parameter" is reported at the TSN AF and used for stage 1 mapping. The 5GS parameters are 5GS QoS profiles at the PCF. During the bridge configuration process, the CNC sends traffic class "7" to the TSN AF, then the AF will find priority and independentDelayMax values in the table and forward them to the PCF. The PCF can then use the priority "7" and independentDelayMax "5 ms" as a key and search for a proper QoS profile, e.g. 5QI to fulling the priority "7" and independentDelayMax "5 ms". In the example, the independentDelayMax is translated to PDB and, for the same value of 5 milliseconds (ms), there might be multiple options. The PCF can use the "priority" value to down-select which 5QI can fit best. The example only shows one possibility of down-selection using the "priority" value. Other down-selection criteria can be applicable as well, e.g. using packet error rate, bandwidth, MDBV, or even other parameters are not part of the QoS profile table, e.g. system load, radio resources.

iv. Preconfigured QoS Flows for 5G-TS QoS Mapping Framework

In previous sections, the methods and options are described in which QoS flows are configured in the bridge configuration phase. However, there can be an alternative in which QoS flows are preconfigured/setup already during the capability report phase. Up to 8 QoS flows can be created at the capability reporting phase in a PDU session.

For example, in FIG. 11 (option 1), a map between TSN parameters and 5G QoS profiles are stored in the PCF. During the bridge capability report period, the 5GS will setup the QoS flows (according to the 5QIs) that are already mapped to the TSN traffic class. For example, when the TSN parameters (TC=7, priority=7, independentDelayMax=5 ms) are reported to the TSN AF, the corresponding QoS flow with 5QI value=85 will be setup, this QoS flow then is reserved for TSN TC "7" even if at the moment there is no incoming TSN traffic. In the UPF the corresponding filter is also setup for this QoS flow so that the incoming traffic with "TC 7" in the header can be mapped to the QoS flow. During the bridge configuration phase the PCF will just verify the mapping request.

In the similar way, the preconfigured QoS flows can be applied to above mentioned options 2 and 3 as well during the capability report phase.

IV. Mapping of Bridge Port and QoS Control in 5GS a. Reason for Proposed Solutions 3GPP TR 23.734 Solution #8 provides an option for a 5GS appearing as a TSN bridge (black box) for integration with a TSN, as described in section 6.8. However, there are still some open issues regarding:
1. the granularity of the 5GS when integrating into the TSN,
2. the mapping between 5GS capabilities and bridge ports, and
3. how to integrate 5G QoS into TSN configuration.

In principle, a 5GS virtual bridge should emulate the behaviors of a TSN bridge in order to facilitate its integration with the TSN system and minimize the impact to other TSN entities (such as CNC, CUC, end-stations, and other bridges).

The resource management of a TSN bridge is based on port configuration which is defined as different managed objects. The port configuration object models the operations that modify, or inquire about, the configuration of the ports of a bridge, which supports the ability to dynamically create and/or delete ports.

The bandwidth management of TSN bridge ports is described in clause 12.20 of IEEE P802.1Qcc (IEEE P802.1Qcc/D1.6: "Draft Standard for Local and metropolitan area networks—Bridges and Bridged Networks—Amendment: Stream Reservation Protocol (SRP) Enhancements and Performance Improvements".): "There is one Bandwidth Availability Parameter Table per Port of a Bridge component. Each table row contains a set of parameters for each traffic lass that supports the credit-based shaper algorithm configured for use with time-sensitive Streams." The delay management of the TSN bridge is described in Clause 12.32 of IEEE P802.1Qcc: "There is one Bridge Delay managed object per Port pair per traffic class of a Bridge component. Each set of Bridge Delay attributes is accessed using three indices: ingress Port, egress Port, and traffic class." The management of traffic scheduling is described in clause 12.29 of IEEE P802.1Qbv: "There is one Gate Parameter Table per Port of a Bridge component. Each table row contains a set of parameters that supports the enhancements for scheduled traffic."

In summary, one TSN bridge port can be configured with one configuration table of bandwidth, delay, and traffic scheduling for each TC. When the 5GS is integrated into the TSN as a bridge, the bridge port exposed by the 5GS should be configured with a maximum 8 QoS profiles for a TSN connection.

In order to simplify the management of 5G virtual bridge, the bridge ports exposed by the 5GS can be binding with PDU sessions or Medium Access Control (MAC) address, both for the UE side and the UPF side. Up to 8 QoS flows can be established in each PDU session to maintain the connection between the UE and the TSN. The parameters of the QoS flows can be exposed to the CNC as bridge port configuration.

b. Summary of Proposed Solution

A proposal of 5G virtual bridge management with TSN port configuration and QoS control.

c. Details of One Implementation of the Proposed Solution as a Change/Update to Solution #30 in TR 23.734.

Next Change, All New 6.30.2 5G Virtual Bridge Configuration and QoS Control Granularity of 5G Bridges for TSN Integration TR 23.734 Solution #8 provides an option for 5G system appearing as a TSN bridge (black box) for integration with TSN, as described in section 6.8. However, solution #8 only illustrated the scenarios of single UE, via a UPF connected to TSN. Further study is required to clarify the management of 5G virtual bridges when multiple UEs and multiple UPFs are serving for TSN. Following 3 options are analysed for different granularity of 5G virtual bridge:

Option 1: Single Virtual Bridge Including all UEs and UPFs. All UEs and UPFs serving for the specific TSN are grouped into a single virtual bridge. The bridge ID can be assigned by mobile operator or TSN operator. The capabilities of each port in UEs and UPFs are integrated as parts of the configuration of the 5G virtual bridge, which is notified to TSN AF and delivered to CNC for TSN bridge registration and modification. Any event of PDU session establishment/modification may cause the reconfiguration of the 5G virtual bridge. The configuration data of the bridge and the frequency of reconfiguration may increase sharply, when the scale of the connected UEs increased.

This option is more feasible for the small scale and static TSN scenarios, which applies for small number of connected UEs and low mobility requirement.

Figure 18:
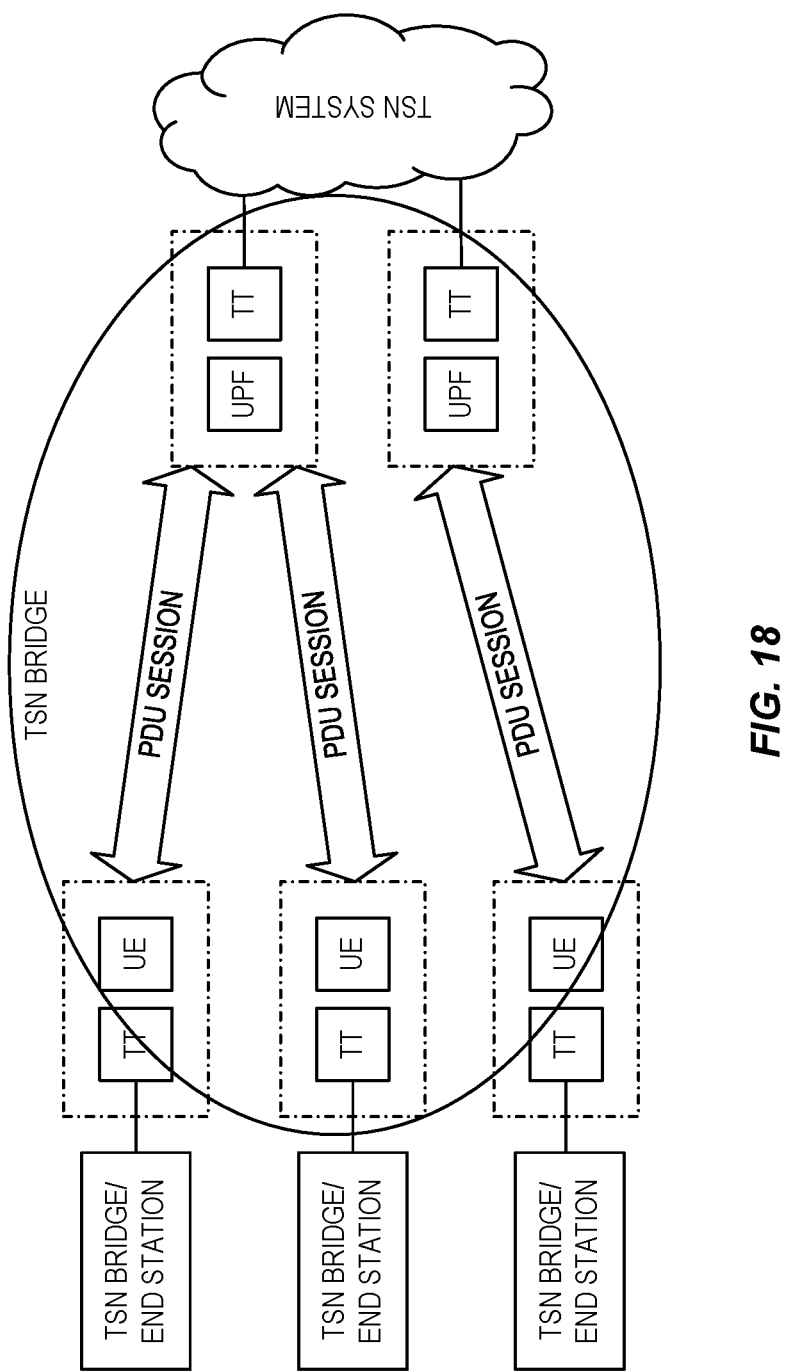
FIG. 18 illustrates an embodiment in which the whole 5GS models a single TSN bridge.
Figure 19:
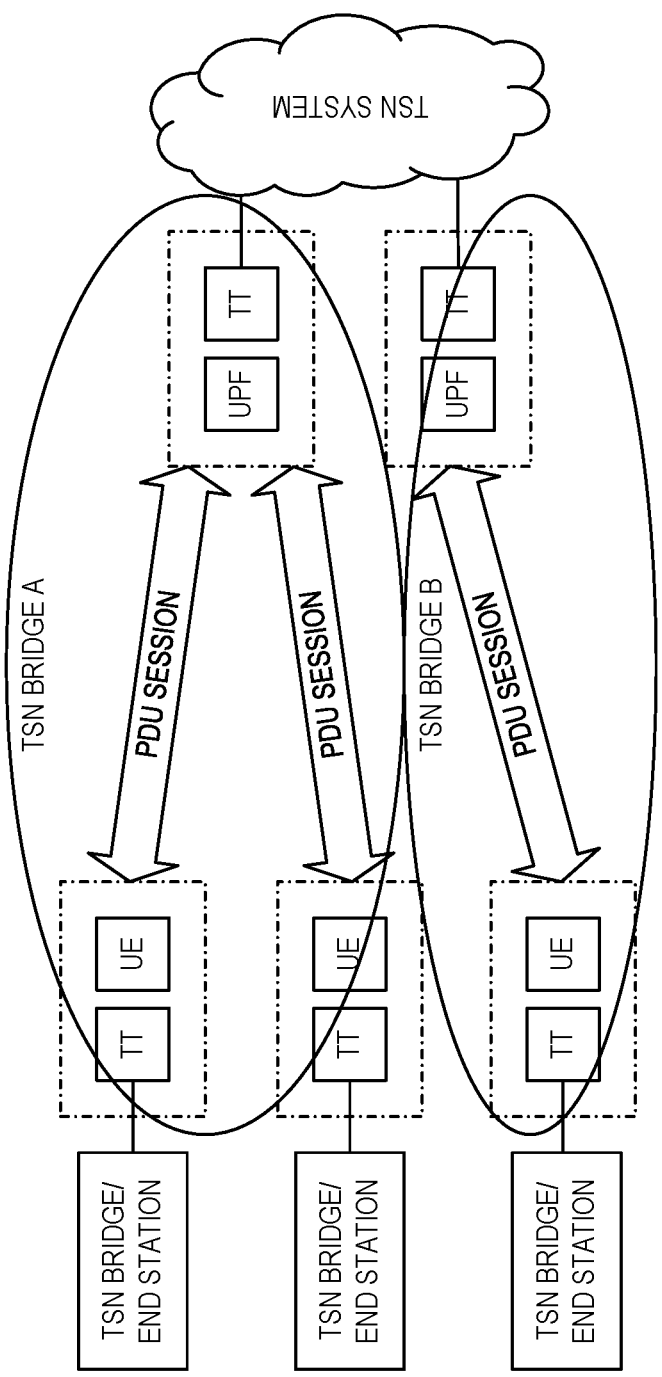
FIG. 19 illustrates an embodiment in which the 5GS models multiple virtual bridges on a per-User Plane Function (UPF) basis.

See FIG. 18

Figure XXX. Option1: The Whole 5G System Modelled as One TSN Bridge

Option 2: Per UPF Based 5G Virtual Bridge.

All UEs connected to a specific PSA UPF and serving for the TSN are grouped into a single virtual bridge. TSN AF ay bind the bridge ID with the UPF ID. The capabilities of each port in UEs and UPF are integrated as parts of the configuration of the 5G virtual bridge, which is notified to TSN AF and delivered to CNC for TSN bridge registration and modification.

Comparing with option 1, this option can lower the scale of a 5G virtual bridge configuration and simplify the connection between TSN and UPF.

FIG. 19

Figure XXX. Option2: Per UPF Based Virtual Bridge

Option 3: Per UE Based 5G Virtual Bridge.

Each UE that has one or more PDU sessions to a specific TSN, is treated as a TSN bridge. TSN AF may bind the bridge ID with the UE ID (such as GPSI). The end points of each PDU sessions (in UE and UPF) is binding as virtual ports of the TSN bridge.

Based on this option, the configuration of each 5G virtual bridge is much simple and flexible. It can avoid bridge reconfiguration caused by other UEs.

Figure 20:
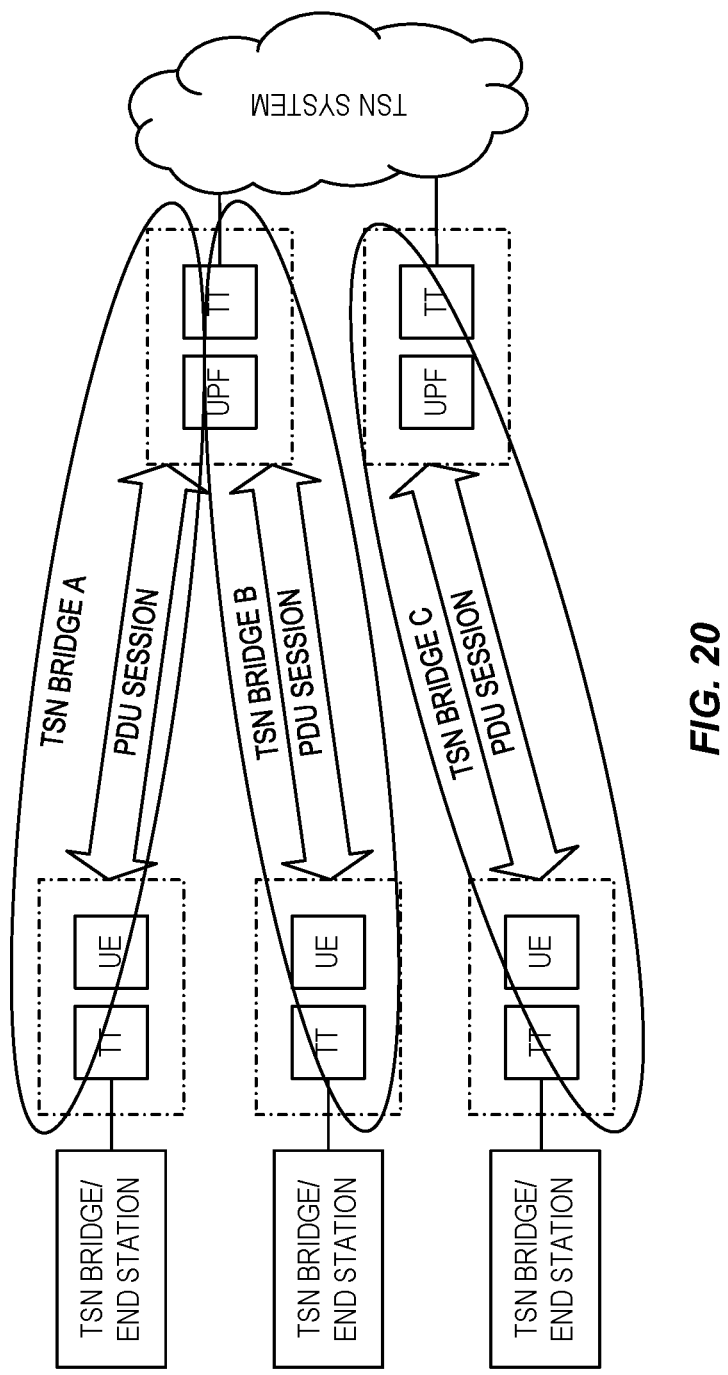
FIG. 20 illustrates an embodiment in which the 5GS models multiple virtual bridges on a per-User Equipment (UE) basis.

See FIG. 20

Figure XXX. Option3: Per UE Based 5G Virtual Bridge

Bridge Port Binding

According to the bridge management specified in IEEE P802.1Qcc [9], and IEEE P802.1Qbv [xx], one TSN bridge port can be configured with one configuration table for each traffic class, includes bandwidth availability, bridge delay, and traffic scheduling etc. The maximum number of traffic classes in a TSN port is 8. When 5GS is integrated into TSN, the bridge port exposed to CNC should be configured to support the same traffic classes. One or more traffic classes are mapped into a 5G QoS flow for transmission. The mapping between TSN traffic class and QoS flow is pre-configured or based on policy control.

When a 5G virtual bridge is configured as option 1 and option2, the TSN AF binds the TSN ports on the UE and UPF side with their MAC addresses.

When a 5G virtual bridge is configured as option 3, TSN AF can bind the TSN ports with PDU sessions. The TSN ports in UE side can be mapped with PDU session ID. The bridge port in UPF side cane be mapped with the combination of UPF ID, and PDU session ID.

A single TSN network may carry variety of time-sensitive data streams, but the allocation of bandwidth should be centrally managed in CNC. CNC can reserve the resource for a stream based on the differentiation of traffic classes. In a 5G virtual bridge, up to 8 QoS flows for TSN traffic may be established in each PDU session, which is binding with different TSN traffic classes. The total number and parameters of the QoS flows can be configured in UE subscription, MNO's policy, AF request or pre-configuration. FIG. 6.x.1.2-1 shows an example of PDU session based TSN ports configuration.

Figure 21:
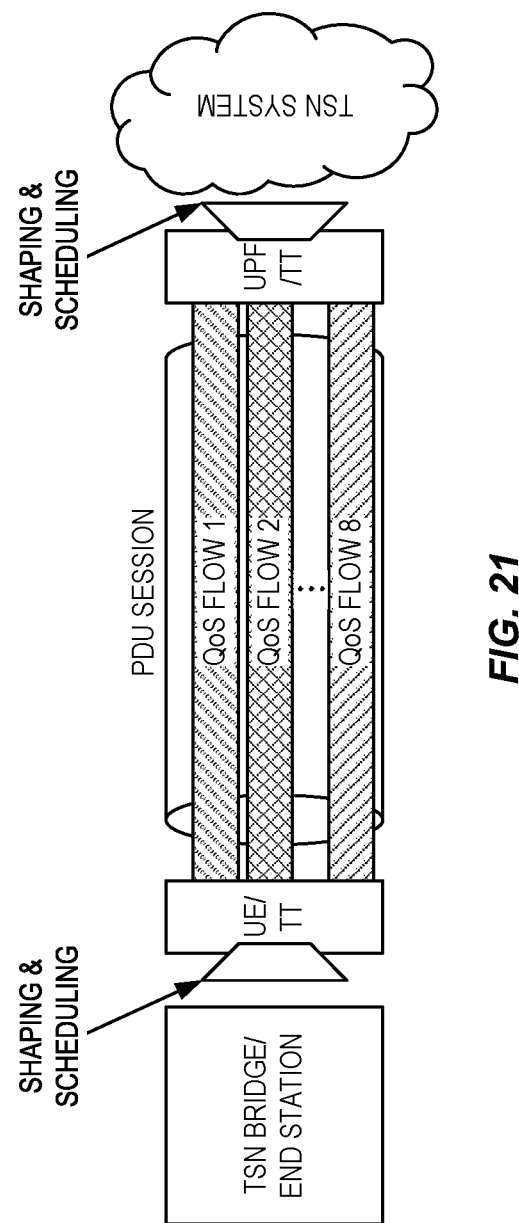
FIG. 21 illustrates an example of Protocol Data Unit (PDU) session based TSN port configuration in accordance with an embodiment of the present disclosure.

See FIG. 21

FIG. 6.x.1.2-1 Example of PDU Session Based TSN Port Configuration

Next Change 6.x.3 Procedures
6.30.3.1 5G Virtual Bridge Onboarding

Figure 22:
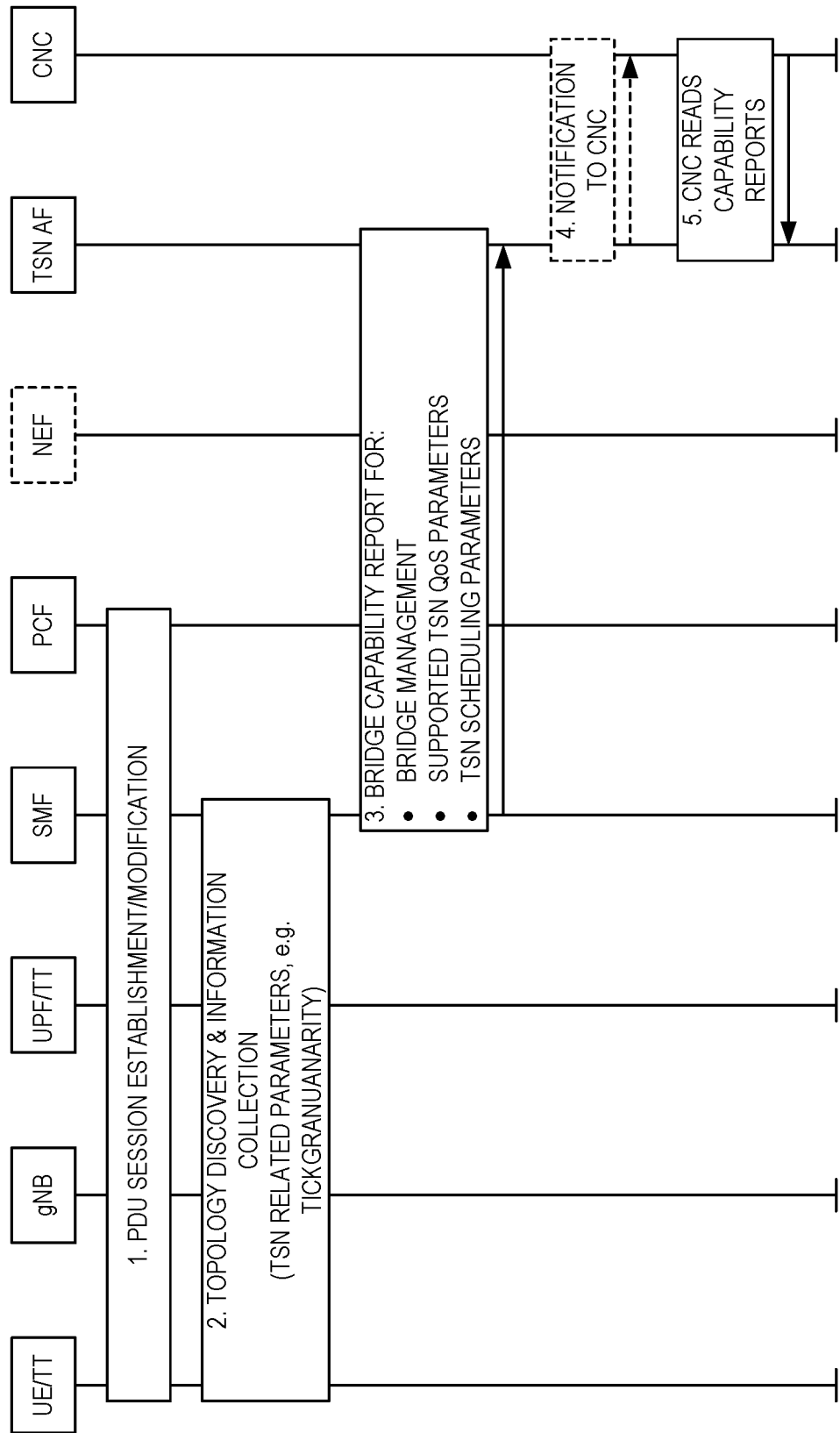
FIG. 22 illustrates a procedure for 5G virtual bridge on boarding in accordance with an embodiment of the present disclosure.

See FIG. 22

1. Based on UE request or trigged via network, a PDU session is established. If the PDU session is to be connected to a TSN, up to 8 GBR QoS flows are configured for the TSN traffic classes according to UE subscription, operator's policy or pre-configuration. The QoS flows may not been established until CNC indicates the resource reservation for arriving streams.
2. Based on the request from SMF, TSN translators in UE side and UPF side collect the network topology, propagate delay and TSN related information.
3. The TSN bridge management information (bridge ID, port ID), supported QoS parameters for TSN and scheduling parameters are reported to TSN AF based on SMF event notification (directly or via NEF).
4. Optional: TSN AF may notify CNC to read the capacity report. E.g. when bridge capability change/update events happen.
5. CNC reads the capability report from 5GS virtual bridge(s).

End of Changes

V. Additional Aspects

Figure 23:
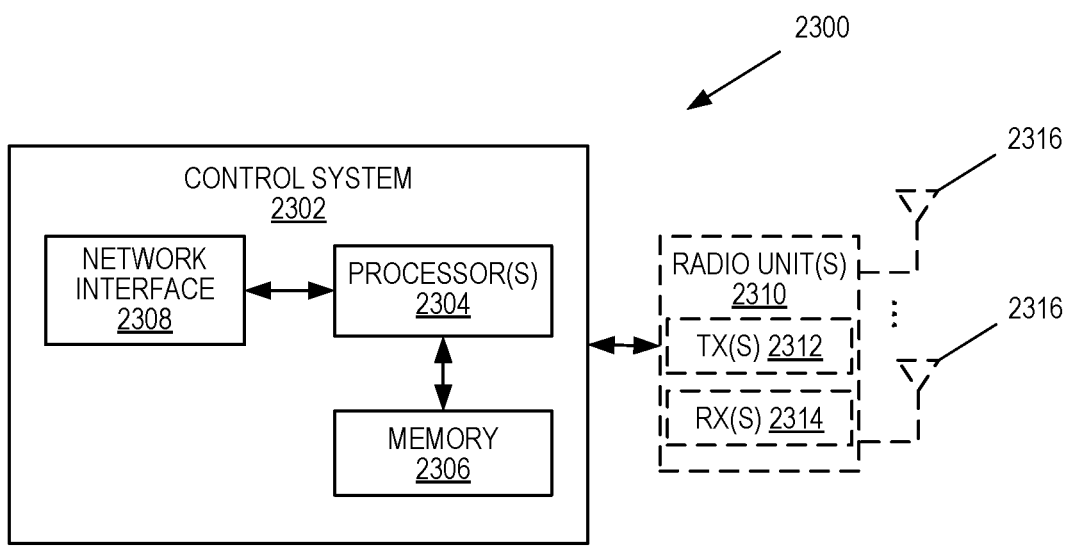

FIG. 23 is a schematic block diagram of a network node 2300 according to some embodiments of the present disclosure. The network node 2300 may be, for example, a base station 102 or 106 or a network node that implements a NF(s). As illustrated, network node 2300 includes a control system 2302 that includes one or more processors 2304 (e.g., Central Processing Units (CPUs), Application Specific Integrated Circuits (ASICs), Field Programmable Gate Arrays (FPGAs), and/or the like), memory 2306, and a network interface 2308. The one or more processors 2304 are also referred to herein as processing circuitry. In addition, if the network node 2300 is a radio access node, the network node 2300 includes one or more radio units 2310 that each includes one or more transmitters 2312 and one or more receivers 2314 coupled to one or more antennas 2316. The radio units 2310 may be referred to or be part of radio interface circuitry. In some embodiments, the radio unit(s) 2310 is external to the control system 2302 and connected to the control system 2302 via, e.g., a wired connection (e.g., an optical cable). However, in some other embodiments, the radio unit(s) 2310 and potentially the antenna(s) 2316 are integrated together with the control system 2302. The one or more processors 2304 operate to provide one or more functions of a network node 2300 as described herein. In some embodiments, the function(s) are implemented in software that is stored, e.g., in the memory 2306 and executed by the one or more processors 2304.

FIG. 24 is a schematic block diagram that illustrates a virtualized embodiment of the network node 2300 according to some embodiments of the present disclosure. This discussion is equally applicable to other types of network nodes. Further, other types of network nodes may have similar virtualized architectures.

As used herein, a "virtualized" network node is an implementation of the network node 2300 in which at least a portion of the functionality of the network node 2300 is implemented as a virtual component(s) (e.g., via a virtual machine(s) executing on a physical processing node(s) in a network(s)). As illustrated, in this example, the network node 2300 includes one or more processing nodes 2400 coupled to or included as part of a network(s) 2402. Each processing node 2400 includes one or more processors 2404 (e.g., CPUs, ASICs, FPGAs, and/or the like), memory 2406, and a network interface 2408. If the network node 2300 is a radio access node, the network node 2300 may include the control system 2302 that includes the one or more processors 2304 (e.g., CPUs, ASICs, FPGAs, and/or the like), the memory 2306, and the network interface 2308 and the one or more radio units 2310 that each includes the one or more transmitters 2312 and the one or more receivers 2314 coupled to the one or more antennas 2316, as described above. The control system 2302 is connected to the radio unit(s) 2310 via, for example, an optical cable or the like. If present, the control system 2302 is connected to the one or more processing nodes 2400 coupled to or included as part of the network(s) 2402 via the network interface 2308.

In this example, functions 2410 of the network node 2300 described herein are implemented at the one or more processing nodes 2400 or distributed across the control system 2302 and the one or more processing nodes 2400 in any desired manner. In some particular embodiments, some or all of the functions 2410 of the network node 2300 described herein are implemented as virtual components executed by one or more virtual machines implemented in a virtual environment(s) hosted by the processing node(s) 2400. As will be appreciated by one of ordinary skill in the art, additional signaling or communication between the processing node(s) 2400 and the control system 2302 is used in order to carry out at least some of the desired functions 2410. Notably, in some embodiments, the control system 2302 may not be included, in which case the radio unit(s) 2310 communicate directly with the processing node(s) 2400 via an appropriate network interface(s).

In some embodiments, a computer program including instructions which, when executed by at least one processor, causes the at least one processor to carry out the functionality of the network node 2300 or a node (e.g., a processing node 2400) implementing one or more of the functions 2410 of the network node 2300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 25:
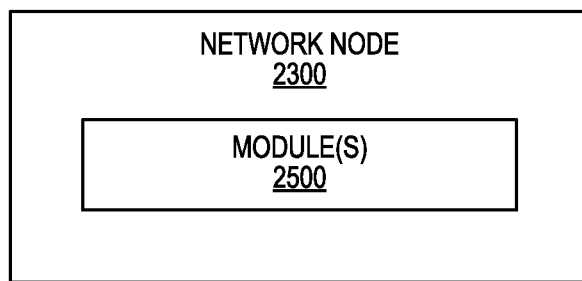

FIG. 25 is a schematic block diagram of the network node 2300 according to some other embodiments of the present disclosure. The network node 2300 includes one or more modules 2500, each of which is implemented in software. The module(s) 2500 provide the functionality of the network node 2300 described herein. This discussion is equally applicable to the processing node 2400 of FIG. 24 where the modules 2500 may be implemented at one of the processing nodes 2400 or distributed across multiple processing nodes 2400 and/or distributed across the processing node(s) 2400 and the control system 2302.

Figure 26:
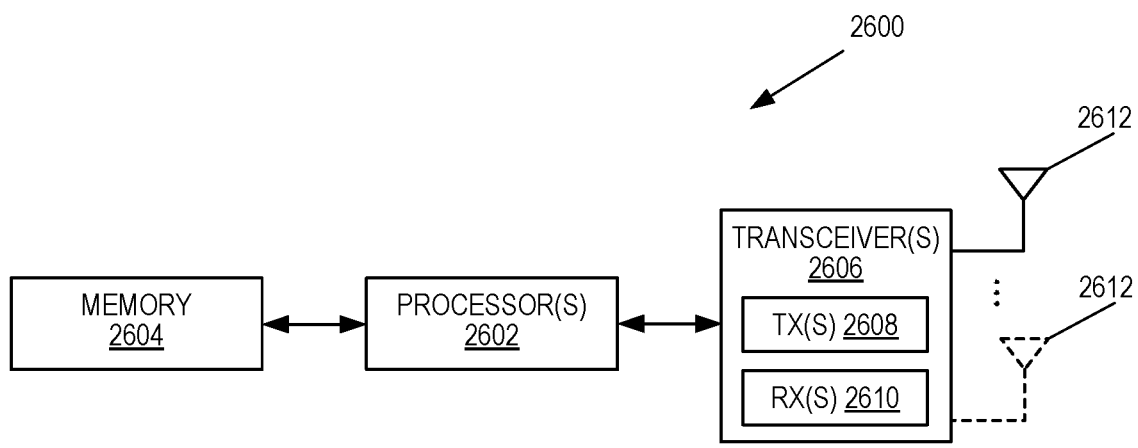
FIGS. 26 and 27 are schematic block diagrams of a UE.

FIG. 26 is a schematic block diagram of a UE 2600 according to some embodiments of the present disclosure. As illustrated, the UE 2600 includes one or more processors 2602 (e.g., CPUs, ASICs, FPGAs, and/or the like), memory 2604, and one or more transceivers 2606 each including one or more transmitters 2608 and one or more receivers 2610 coupled to one or more antennas 2612. The transceiver(s) 2606 includes radio-front end circuitry connected to the antenna(s) 2612 that is configured to condition signals communicated between the antenna(s) 2612 and the processor(s) 2602, as will be appreciated by on of ordinary skill in the art. The processors 2602 are also referred to herein as processing circuitry. The transceivers 2606 are also referred to herein as radio circuitry. In some embodiments, the functionality of the UE 2600 described above may be fully or partially implemented in software that is, e.g., stored in the memory 2604 and executed by the processor(s) 2602. Note that the UE 2600 may include additional components not illustrated in FIG. 26 such as, e.g., one or more user interface components (e.g., an input/output interface including a display, buttons, a touch screen, a microphone, a speaker(s), and/or the like and/or any other components for allowing input of information into the UE 2600 and/or allowing output of information from the UE 2600), a power supply (e.g., a battery and associated power circuitry), etc.

In some embodiments, a computer program including instructions which, when executed by at least one processor, causes the at least one processor to carry out the functionality of the UE 2600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 27:
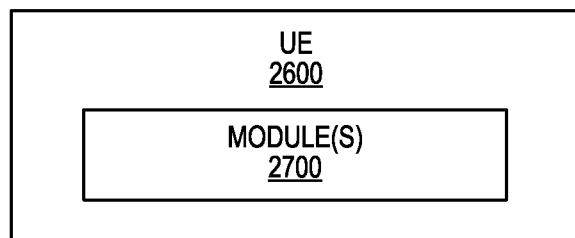

FIG. 27 is a schematic block diagram of the UE 2600 according to some other embodiments of the present disclosure. The UE 2600 includes one or more modules 2700, each of which is implemented in software. The module(s) 2700 provide the functionality of the UE 2600 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

VI. Example Embodiments

Some example embodiments of the present disclosure are as follows.

Embodiment 1: A method performed by UE or UE-side translator that operates as an egress port of a virtual bridge formed by a cellular communications system for a time-sensitive network, the method comprising: sending, to a network node of the cellular communications system, one or more parameters that relate to capabilities of the virtual bridge.

Embodiment 2: The method of embodiment 1 wherein the UE or UE-side translator operates, as the egress port of the virtual bridge, to provide gate scheduling.

Embodiment 3: The method of embodiment 2 wherein the one or more parameters comprise a parameter that defines a clock accuracy (e.g., clock accuracy of the UE or UE-side translator).

Embodiment 4: The method of embodiment 2 wherein the time-sensitive network is an IEEE 802.1Qbv network.

Embodiment 5: The method of embodiment 4 wherein the one or more parameters comprise the TickGranularity parameter.

Embodiment 6: The method of any one of embodiments 1 to 5 wherein the cellular communications system is a 5G system.

Embodiment 7: The method of embodiment 6 wherein sending the one or more parameters comprises sending the one or more parameters to the network node such that the one or more parameters are communicated to a time-sensitive network application function responsible for providing the one or more parameters to a controller of the time-sensitive network.

Embodiment 8: The method of embodiment 6 or 7 wherein sending the one or more parameters to the network node comprises sending the one or more parameters to an AMF (e.g., via NAS signaling).

Embodiment 9: A method performed by UPF or UPF-side translator that operates as an egress port of a virtual bridge formed by a cellular communications system for a time-sensitive network, the method comprising: sending, an application function associated with the cellular communications system, one or more parameters that relate to capabilities of the virtual bridge.

Embodiment 10: The method of embodiment 9 wherein the UPF or UPF-side translator operates, as the egress port of the virtual bridge, to provide gate scheduling.

Embodiment 11: The method of embodiment 10 wherein the one or more parameters comprise a parameter that defines a clock accuracy (e.g., clock accuracy of the UPF or UPF-side translator).

Embodiment 12: The method of embodiment 10 wherein the time-sensitive network is an IEEE 802.1Qbv network.

Embodiment 13: The method of embodiment 12 wherein the one or more parameters comprise the TickGranularity parameter.

Embodiment 14: The method of any one of embodiments 9 to 13 wherein the cellular communications system is a 5G system.

Embodiment 15: The method of embodiment 14 wherein sending the one or more parameters comprises sending the one or more parameters to the application function such that the one or more parameters are communicated to a controller of the time-sensitive network.

Embodiment 16: The method of embodiment 14 or 15 wherein sending the one or more parameters to the network node comprises sending the one or more parameters to the application function via an existing procedure of the 5G system.

Embodiment 17: A method of operation of a node associated with a cellular communications system, operating as a virtual bridge for a time-sensitive network, the method comprising at least one of: receiving, from a controller of the time-sensitive network, one or more parameters; providing the one or more parameters or one or more translated parameters to a node that operates as a TSN translator at an egress point of the cellular communications system for the virtual bridge, the one or more translated parameters being one or more parameters of the cellular communications system mapped to or otherwise derived from the one or more parameters received from the controller of the time-sensitive network.

Embodiment 18: The method of embodiment 17 wherein the time-sensitive network is an IEEE 802.1Qbv network.

Embodiment 19: The method of embodiment 17 wherein the one or more parameters received from the controller of the time-sensitive network comprise: AdminControlList and AdminBaseTime.

Embodiment 20: The method of embodiment 19 wherein the one or more parameters received from the controller of the time-sensitive network further comprise: queueMaxSDUTable, SupportedListMax, and/or AdminGateStates.

Embodiment 21: The method of any one of embodiments 17 to 20 wherein the cellular communications system is a 5G system.

Embodiment 22: The method of any one of embodiments 17 to 21 wherein the node operating at the egress point is: a UE or UE-side translator or a UPF or UPF-side translator.

Embodiment 23: A method performed by PCF in a cellular communications system that provides a virtual bridge for a time-sensitive network, the method comprising: receiving, from another node of the cellular communications system, one or more cellular communications system parameters (e.g., one or more QoS parameters); mapping the one or more cellular communications system parameters to one or more TSN parameters (e.g., using a predefined or preconfigured mapping or table).

Embodiment 24: The method of embodiment 23 further comprising providing the one or more TSN parameters to another entity (e.g., a TSN AF).

Embodiment 25: The method of embodiment 23 or 24 further comprising bridge management information (e.g., a bridge ID) of the virtual bridge and providing the bridge management information to another entity (e.g., a TSN AF).

Embodiment 26: The method of embodiment 25 wherein the cellular communications system provides one or more virtual bridges, and the virtual bridge information comprises information that identifies one of the one or more virtual bridges.

Embodiment 27: A method performed by PCF in a cellular communications system that operates a virtual bridge for a time-sensitive network, the method comprising: receiving, from another node associated with the cellular communications system, one or more TSN parameters; mapping the one or more TSN parameters to one or more cellular communications system parameters (e.g., one or more QoS parameters) (e.g., using a predefined or preconfigured mapping or table).

Embodiment 28: The method of embodiment 27 further comprising providing the one or more cellular communications system parameters to another node in the cellular communications system.

Embodiment 29: A method performed by an AF associated with a cellular communications system that operates a virtual bridge for a time-sensitive network, the method comprising: receiving, from a node of the cellular communications system, one or more cellular communications system parameters (e.g., one or more QoS parameters); mapping the one or more cellular communications system parameters to one or more TSN parameters (e.g., using a predefined or preconfigured mapping or table).

Embodiment 30: The method of embodiment 29 further comprising providing the one or more TSN parameters to a controller of the TSN.

Embodiment 31: A method performed by an AF associated with a cellular communications system that operates a virtual bridge for a time-sensitive network, the method comprising: receiving, from a controller of the TSN, one or more TSN parameters; mapping the one or more TSN parameters to one or more cellular communications system parameters (e.g., one or more QoS parameters) (e.g., using a predefined or preconfigured mapping or table).

Embodiment 32: The method of embodiment 31 further comprising providing the one or more cellular communications system parameters to another node in the cellular communications system.

Embodiment 33: A method performed by an AF associated with a cellular communications system that operates a virtual bridge for a time-sensitive network, the method comprising: receiving, from a controller of the TSN, one or more TSN parameters; partially mapping the one or more TSN parameters to one or more cellular communications system parameters (e.g., one or more QoS parameters) (e.g., using a predefined or preconfigured mapping or table); and sending, to a PCF, information about the partial mapping of the one or more TSN parameters to the one or more cellular communications system parameters.

Embodiment 34: The method of embodiment 33 further comprising providing the one or more cellular communications system parameters to another node in the cellular communications system.

Embodiment 35: A device adapted to operate in accordance with any one of embodiments 1 to 33.

Embodiment 36: A device comprising: a communication interface (e.g., RF transmitter(s) and/or network interface(s)); and processing circuitry associated with the communication interface, the processing circuitry configured to cause the device to operate in accordance with any one of embodiments 1 to 33.

At least some of the following abbreviations may be used in this disclosure. If there is an inconsistency between abbreviations, preference should be given to how it is used above. If listed multiple times below, the first listing should be preferred over any subsequent listing(s).

μs Microsecond
3GPP Third Generation Partnership Project
5G Fifth Generation
5GC Fifth Generation Core
5GS Fifth Generation System
5QI Fifth Generation Quality of Service Indicator
AF Application Function
AMF Access and Mobility Management Function
AN Access Network
ASIC Application Specific Integrated Circuit
AUSF Authentication Server Function
CNC Centralized Network Controller
CPU Central Processing Unit
CR Change Request
CUC Central User Configuration
DEI Drop Eligible Indicator
DN Data Network
DSP Digital Signal Processor
eNB Enhanced or Evolved Node B
FIFO First-In-First-Out
FPGA Field Programmable Gate Array
gNB New Radio Base Station
ID Identifier
IEC International Electrotechnical Commission
IEEE Institute of Electrical and Electronics Engineers
IP Internet Protocol
LTE Long Term Evolution
MAC Medium Access Control
MDBV Maximum Data Burst Volume
MME Mobility Management Entity
ms Millisecond
MTC Machine Type Communication
NAS Non-Access Stratum
NEF Network Exposure Function
NF Network Function
NR New Radio
NRF Network Repository Function
NSSF Network Slice Selection Function
OAM Operations and Management
PCF Policy Control Function
PCP Port Control Protocol
PDB Packet Delay Budget
PDU Protocol Data Unit
PER Packet Error Ratio
P-GW Packet Data Network Gateway
QFI Quality of Service Flow Identifier
QoS Quality of Service
RAM Random Access Memory
RAN Radio Access Network
ROM Read Only Memory
RRH Remote Radio Head
RTT Round Trip Time
SCEF Service Capability Exposure Function
SDU Support Data Unit
SMF Session Management Function
TC Traffic Class
TR Technical Report
TS Technical Specification
TSC Transformed Successive Cancellation
TSN Time-Sensitive Networking
TT Time-Sensitive Networking Translator
UE User Equipment
UDM Unified Data Management
UPF User Plane Function
VLAN Virtual Local Area Network Those skilled in the art will recognize improvements and modifications to the embodiments of the present disclosure. All such improvements and modifications are considered within the scope of the concepts disclosed herein.

REFERENCES

[1] H. Kagermann et al., "Recommendations for implementing the strategic initiative INDUSTRIE 4.0," Final report of the Industrie 4.0 Working Group, acatech—National Academy of Science and Engineering, Munich, April 2013

"Technical Specification Group Services and System Aspects; Study on Communication for Automation in Vertical Domains (Release 16)," Technical Report 22.804, Version 16.2.0, 3GPP Organization Partners, December 2018

What is claimed is:

1. A method performed by one or more network nodes of a cellular communications system, the cellular communications system operating as a virtual Time-Sensitive Networking, TSN, bridge of a TSN network, the method comprising:
providing, to a controller associated with the TSN network, two or more parameters that relate to capabilities of the virtual TSN bridge, wherein the two or more parameters that relate to the capabilities of the virtual TSN bridge comprise:
a first parameter that defines a clock accuracy and a minimum value of periodicity for an entity in the cellular communications system that operates gating control for the virtual TSN bridge; and
a second parameter that informs the controller associated with the TSN network that the virtual TSN bridge or a particular egress port of the virtual TSN bridge is restricted to exclusive gating such that operation of Transmission Selection algorithm is not required, wherein exclusive gating means that only frames belonging to a single TSN traffic class are transmitted from egress ports of the virtual TSN bridge or the particular egress port of the virtual TSN bridge at a given time.

2. The method of claim 1 wherein:
the one or more network nodes comprise an application function associated with a core network of the cellular communications system such that the method performed by the one or more network nodes is a method performed by the application function; and providing the two or more parameters that relate to capabilities of the virtual TSN bridge to the controller associated with the TSN network comprises providing, from the application function to the controller associated with the TSN network, the two or more parameters that relate to capabilities of the virtual TSN bridge.

3. The method of claim 2 further comprising receiving, at the application function, at least the first parameter from another network node that is in the core network of the cellular communications system via a cellular network procedure.

4. The method of claim 2 further comprising:
receiving, from the controller associated with the TSN network, a plurality of TSN bridge configuration parameters; and
either: (a) sending only a subset of the plurality of TSN bridge configuration parameters to one or more other network nodes in the cellular communications system or (b) sending, to the one or more other network nodes, information that corresponds to a translation of the subset of the plurality of TSN bridge configuration parameters into one or more parameters of the cellular communications system;
wherein the subset of the plurality of TSN bridge configuration parameters is less than all of the plurality of TSN bridge configuration parameters.

5. The method of claim 4 wherein the TSN network is an IEEE 802.1Qbv TSN network, and the subset of the plurality of TSN bridge configuration parameters comprises:
an AdminControlList parameter that describes a sequence of gate operation states in a list of GateControlEntries, wherein each GateControlEntry in the list of GateControlEntries comprises:
a GateStatesValue parameter that is a list of gate state values that indicate either "open" or "closed" for each TSN traffic class supported by a respective TSN port; and
a TimeIntervalValue parameter that specifies a time during which the list of gate state values indicated by the GateStatesValue parameter are to be applied; and
an AdminBaseTime parameter that specifies when a gating cycle is to be started.

6. The method of claim 5 wherein the subset of the plurality of TSN bridge configuration parameters further comprises:
i. queueMaxSDUTable,
ii. SupportedListMax,
iii. AdminGateStates, or
iv. any combination of two or more of i, ii, and iii.

7. The method of claim 1 wherein:
the one or more network nodes comprise an egress node of the cellular communications system such that the method performed by the one or more network nodes is a method performed by the egress node; and
providing the two or more parameters that relate to capabilities of the virtual TSN bridge to the controller associated with the TSN network comprises sending, from egress node to a network node in the cellular communications system, the first parameter such that the first parameter is passed from the egress node to an application function associated with the TSN network via a cellular network procedure.

8. The method of claim 1 wherein:
the one or more network nodes comprise a User Equipment, UE, associated with a TSN translator that performs gating control such that the method performed by the one or more network nodes is a method performed by the UE; and
providing the two or more parameters that relate to capabilities of the virtual TSN bridge to the controller associated with the TSN network comprises sending, from the UE to a network node in the cellular communications system, the first parameter such that the first parameter is passed from the UE to an application function associated with the TSN network via a cellular network procedure.

9. The method of claim 8 wherein the cellular network procedure is a Protocol Data Unit, PDU, session establishment procedure or a PDU session modification procedure.

10. The method of claim 1 wherein:
the one or more network nodes comprise a User Plane Function, UPF, in a core network of the cellular communications system, the UPF being associated with a TSN translator that performs gating control, such that the method performed by the one or more network nodes is a method performed by the UPF; and
providing the two or more parameters that relate to capabilities of the virtual TSN bridge to the controller associated with the TSN network comprises sending, from the UPF to a network node in the cellular communications system, the first parameter such that the first parameter is passed from the UE to an application function associated with the TSN network via a cellular network procedure.

11. The method of claim 10 wherein the cellular network procedure is a N4 session establishment procedure or a N4 session modification procedure.

12. The method of claim 1 wherein the virtual TSN bridge is a virtual TSN bridges in an IEEE 802.1Qbv TSN network.

13. The method of claim 12 wherein the cellular communications system is a Third Generation Partnership Project, 3GPP, Fifth Generation System, 5GS.

14. A network node for a cellular communications system, the network node comprises processing circuitry configured to cause the network node to operate as a virtual Time-Sensitive Networking, TSN, bridge of a TSN network to:
provide, to a controller associated with the TSN network, two or more parameters that relate to capabilities of the virtual TSN bridge, wherein the two or more parameters that relate to the capabilities of the virtual TSN bridge comprise:
a first parameter that defines a clock accuracy and a minimum value of periodicity for an entity in the cellular communications system that operates gating control for the virtual TSN bridge; and
a second parameter that informs the controller associated with the TSN network that the virtual TSN bridge or a particular egress port of the virtual TSN bridge is restricted to exclusive gating such that operation of Transmission Selection algorithm is not required, wherein exclusive gating means that only frames belonging to a single TSN traffic class are transmitted from an egress port(s) of the virtual TSN bridge or the particular egress port of the virtual TSN bridge at a given time.

15. The network node of claim 14 wherein:
the network node implements an application function associated with a core network of the cellular communications system; and
the network node is further adapted to provide the one or more parameters that relate to capabilities of the virtual TSN bridge from the application function to the controller associated with the TSN network.

16. The network node of claim 14 wherein the network node comprises:
a network interface; and
processing circuitry associated with the network interface, the processing circuitry associated with the network interface configured to cause the network node to provide the one or more parameters that relate to the capabilities of the virtual TSN bridge to the controller associated with the TSN network.

* * * * *